(12) United States Patent
Wang

(10) Patent No.: US 10,252,607 B2
(45) Date of Patent: Apr. 9, 2019

(54) SYSTEM ECONOMICALLY USING COMPRESSED AIR AS AN AUTOMOBILE POWER SOURCE AND METHOD THEREOF

(71) Applicant: Lifeng Wang, Spånga (SE)

(72) Inventor: Lifeng Wang, Spånga (SE)

( * ) Notice: Subject to any disclaimer, the term of this patent is extended or adjusted under 35 U.S.C. 154(b) by 0 days.

(21) Appl. No.: 15/577,748

(22) PCT Filed: May 30, 2016

(86) PCT No.: PCT/SE2016/000030
§ 371 (c)(1),
(2) Date: Nov. 28, 2017

(87) PCT Pub. No.: WO2016/195564
PCT Pub. Date: Dec. 8, 2016

(65) Prior Publication Data
US 2018/0186228 A1    Jul. 5, 2018

(30) Foreign Application Priority Data

May 29, 2015 (CN) .................... ZL2015 2 0365135

(51) Int. Cl.
*B60K 3/00* (2006.01)
*B60K 3/02* (2006.01)
(Continued)

(52) U.S. Cl.
CPC ............. *B60K 3/02* (2013.01); *B60K 3/00* (2013.01); *B60K 6/10* (2013.01); *B60K 6/12* (2013.01);
(Continued)

(58) Field of Classification Search
CPC ... B60K 3/00; B60K 3/04; B60K 6/00; B60K 17/08; B60K 17/165
See application file for complete search history.

(56) References Cited

U.S. PATENT DOCUMENTS 3,986,575 A * 10/1976 Eggmann ................. B60K 3/04
 180/301
4,018,050 A * 4/1977 Murphy .................... F01B 1/02
 60/370
(Continued)

FOREIGN PATENT DOCUMENTS

DE         62172 C    10/1891
FR       2323034      4/1977
(Continued)

*Primary Examiner* — Hau V Phan
(74) *Attorney, Agent, or Firm* — Morgan, Lewis & Bockius LLP

(57) ABSTRACT

The present invention provides a system and method for economically using compressed air as automobile power source, comprising: a compressed air power device, which includes automobile air storage tubes (1) to store a sufficient amount of high-pressure compressed air and a cylinder-combined engine consisting of the first and second cylinders (9)(10), and which can make full use of the compressed air to produce driving power; a mechanism to produce, store and provide high-pressure compressed air, which includes a boiler-type high-pressure compressed air producing and storing device, abbreviated as boiler-type HCAPS device (4), to be able to use electricity during periods of low energy demand (off-peak) such as at night simultaneously recovering the by-produced heat for central heating, and pressurizing and inflating into the automobile air storage tubes (1) during daytimes; brake energy recovery and regeneration devices, which include a spring reserving-releasing device and/or a compressed air reserving-releasing device to save the compressed air in the automobile air storage tubes (1) for saving the driving power; an inner gear ring assembly, which includes an inner gear ring (2) gearing meshing with inner acting gears (45), with the first and second accelerating gears (72)(92), with a flywheel front inner meshing gear (48) and reset gears (46), for transmitting torque and mixing/output- (Continued)

ting power; some clutch transmission devices and a controller, which controls orderly coordinated operation of devices and mechanisms.

10 Claims, 7 Drawing Sheets

(51) Int. Cl.
| | |
|---|---|
| *B60K 6/10* | (2006.01) |
| *B60K 6/12* | (2006.01) |
| *B60T 1/10* | (2006.01) |
| *B60W 30/18* | (2012.01) |
| *F03G 1/00* | (2006.01) |
| *B60T 1/06* | (2006.01) |
| *F16D 61/00* | (2006.01) |
| *F04B 27/00* | (2006.01) |
| *B60K 17/08* | (2006.01) |
| *B60K 17/16* | (2006.01) |
| *F01B 11/00* | (2006.01) |
| *F01B 17/02* | (2006.01) |
| *F01B 17/04* | (2006.01) |
| *F01B 23/02* | (2006.01) |
| *F01B 25/10* | (2006.01) |
| *F04B 35/01* | (2006.01) |

(52) U.S. Cl.
CPC ............ *B60K 17/08* (2013.01); *B60K 17/165* (2013.01); *B60T 1/062* (2013.01); *B60T 1/10* (2013.01); *B60W 30/18* (2013.01); *F01B 11/007* (2013.01); *F01B 17/022* (2013.01); *F01B 17/04* (2013.01); *F01B 23/02* (2013.01); *F01B 25/10* (2013.01); *F03G 1/00* (2013.01); *F04B 27/00* (2013.01); *F04B 35/01* (2013.01); *F16D 61/00* (2013.01); *B60Y 2400/15* (2013.01); *B60Y 2400/162* (2013.01)

(56) References Cited

U.S. PATENT DOCUMENTS

| | | | | |
|---|---|---|---|---|
| 4,104,955 | A | * | 8/1978 | Murphy .................... F01B 1/02 91/176 |
| 4,123,910 | A | * | 11/1978 | Ellison, Sr. .............. B60K 3/00 180/302 |
| 4,753,078 | A | | 6/1988 | Gardner, Jr. |
| 7,743,872 | B2 | * | 6/2010 | Brookman .............. F01K 15/02 180/302 |
| 8,701,804 | B1 | * | 4/2014 | Antrobus ................. B60K 6/00 180/302 |
| 9,309,785 | B2 | * | 4/2016 | Brookman .............. F01K 15/02 |
| 2009/0114195 | A1 | * | 5/2009 | Hall ......................... B60K 6/12 123/559.1 |
| 2010/0116578 | A1 | * | 5/2010 | Mustafa .................... B60K 3/04 180/165 |
| 2011/0198143 | A1 | | 8/2011 | Gravino |
| 2012/0201657 | A1 | * | 8/2012 | Donnelly ................. F02C 6/20 415/123 |
| 2012/0221223 | A1 | * | 8/2012 | Schaffeld ................ F02B 33/38 701/102 |
| 2013/0000295 | A1 | * | 1/2013 | Bissontz ............... B60W 10/06 60/409 |
| 2013/0047595 | A1 | * | 2/2013 | Khajepour ............ F04B 27/067 60/370 |
| 2014/0223896 | A1 | | 8/2014 | Zhou |
| 2014/0369853 | A1 | * | 12/2014 | Siuchta ................... B60T 17/02 417/26 |
| 2015/0073684 | A1 | * | 3/2015 | Renner .................... B60P 3/14 701/112 |
| 2015/0136077 | A1 | * | 5/2015 | Cattani ................... F02D 13/04 123/327 |
| 2016/0297304 | A1 | * | 10/2016 | Brookman .............. B60K 3/04 |

FOREIGN PATENT DOCUMENTS

| | | |
|---|---|---|
| JP | 2003-301922 A | 10/2003 |
| WO | WO-2009/112415 A1 | 9/2009 |
| WO | WO-2011/003384 A1 | 1/2011 |
| WO | WO-2014/051480 A1 | 4/2014 |

* cited by examiner

SYSTEM ECONOMICALLY USING COMPRESSED AIR AS AN AUTOMOBILE POWER SOURCE AND METHOD THEREOF

TECHNICAL FIELD

This invention relates to the field of compressed air power production and application technology, particularly providing a system and method for economical use of compressed air as automobile power source.

BACKGROUND TECHNOLOGY

Global energy security and climate change put forward the requirements for energy conservation and emissions reduction upon on the existing automobile technology. Therefore the multinational efforts have been made on research and development of automobile model transformation and technological innovation, especially focused on the development of new energy and clean energy, recovery and utilization of braking energy, hybrid power, etc.

In recent years, a number of news release and demo achievements have presented a type of compressed-air cars, such as MDI (Motor Development International) in France, Tata Motors in India, etc. They use a kind of compressed air engine to drive vehicles, wherein the air is compressed by an electric air compressor into the vehicle-mounted compressed air tank as power source, referred to as existing technology compressed-air vehicles.

For the above existing technology compressed-air vehicles, the compressed air from the vehicle-mounted compressed air tank is heated and injected into the vehicle-mounted compressed air engine, pushing the pistons to drive the crankshaft rotating, and the vehicle running, which mileage and speed need to improve, upon the improvement and full utilization of the vehicular compressed air energy storage. The existing technology compressed-air vehicles are generally equipped with a second propulsion system, focusing on braking energy recycling and/or as an auxiliary power, that is, using vehicular compressed air engine and electric motor or internal combustion engine as hybrid power, wherein the mileage powered by electric motor or combustion engine accounts for a large proportion of the travel of the existing technology compressed-air vehicles. While electric motor or internal combustion engine used in such hybrid power have their respective problems: such as electric power portion comprises larger battery, motor and generator (or motor-generator), significantly increasing the vehicle weight, in contradiction to "lightweight", one of development trends of compressed air vehicles; the more serious problem is the environmental pollution of battery, polluting the soil, more difficult to deal with than polluting air or water resources; one can imagine the disaster to future generations after thousands, hundreds of millions of large batch after batch of batteries would be abandoned. As for the internal combustion engine power, it has been known that the standard internal combustion engines have only about 30% of the efficiency even under very good conditions, meaning that "70% of energy in each gallon of gasoline leave cars as waste heat", inconsistent with the purpose to develop compressed-air vehicles as future economic and environmentally friendly vehicles. In 2012, this inventor made an authorized patent "Automobile brake energy storing-releasing driving device" (patent No. ZL 2012 2 05111952), the PCT International application "Device for vehicle energy storage/release when braking/actuating and method thereof" (International application No. PCT/SE2013/000100), which can store the kinetic energy, lost during automobile deceleration and braking in the form of air pressure potential energy, and release it in the form of kinetic energy during automobile starting and acceleration. This recent automobile brake energy recycling device has not been widely used yet.

Furthermore, whether or not any kind of new energy vehicles is capable for energy saving and emission reduction should be considered upon the energy consumption and emission not only during vehicle's running, but also during the process producing and supplying the new energy.

The existing technology compressed-air vehicle uses electric air compressor to pressurize and inflate the compressed air as an energy source into the vehicle-mounted compressed air tank, wherein some capable families can try to use household electric air compressor to pressurize and inflate the compressed air into the vehicle-mounted compressed air tank while most of the users use larger power air compressors at service stations. Physical experiments have shown that a gas is rapidly compressed with increasing its temperature, while quickly expanding with decreasing its temperature. According to the authorized determination, only 10% of electrical energy consumed by electric air compressor can be transmitted into the compressed air, while the remaining 90% is converted into heat energy. So much of heat energy is not needed for any of existing technology compressed air vehicles but a large amount of waste heat produced during the process of pressurizing and inflating air into the vehicle-mounted compressed air tank. It has been reported that, without a cooling step, a high temperature of 1000° C. can be reached when compressing air. The above process of pressurizing and inflating air into the vehicle-mounted compressed air tank is provided with inter-cooling, including a "four-stage air compression with inter-cooling", that is, the air compression proceeds in 4 stages where the air with a temperature increased after the first stage compression is cooled before the second stage compression . . . up to 4 stages, between which there are 3 steps of inter-cooling accompanied by a remarkable loss of thermal energy. When using electric air compressor to pressurize and inflate air respectively into one compressed air tank after another mounted on the corresponding existing technology compressed-air vehicles, it is not so easy to make centralized recovery and effective use of those batches of waste heat produced during the process. As a result, the air temperature in the vehicle-mounted compressed air tank is also increased and this part of heat energy is consumed onboard if the compressed air in the tank is not fully cooled when the pressurizing and inflating process ends. Then during the air temperature in the tank drops the air pressure in the tank is to drop as its temperature does, resulting in the automatic decrease of energy storage in the vehicle-mounted compressed air tank, therefore a rapid and effective cooling facility onboard is correspondingly needed in order to retard the severity of this happening. The comprehensive and cumulative calculations have indicated a great loss of electric energy in such an approach to produce and supply the compressed air, significantly reducing the superiority of the existing technology compressed-air vehicles in energy-saving and emission reduction.

SUMMARY OF THE INVENTION

Technical Problems to be Solved

The technical problems to be solved are energy saving and low-cost production of high-pressure compressed air, full use of automobile-mounted high-pressure compressed air as driving power, recovery and regeneration of brake energy to reduce consumption of compressed air during driving, to provide a system economically using compressed air as automobile power source and method thereof.

Technical Solutions

In order to solve the above technical problems, this invention provides a system economically using compressed air as automobile power source, the system comprises a compressed air power device, a mechanism to produce, store and provide compressed air, a brake energy recovery and regeneration device, an inner gear ring assembly, some clutch transmission devices and a controller;

wherein, the compressed air power device includes one or more air storage tubes on an automobile and one or more cylinder-combined engines for using the compressed air to produce driving power; the mechanism to produce, store and provide the compressed air includes a boiler-type high-pressure compressed air production and storage device, abbreviated as boiler-type HCAPS device, and an air compressor, the working pressure of the air compressor is close to, equal to or exceeds 100 Mpa; wherein the boiler-type HCAPS device consists of a water tank and a bent tube-type high-pressure compressed air storage, while the bent tube-type high-pressure compressed air storage is arranged inside the water tank, with its one end connected with the air compressor and another end with air inflation equipment to connect with the air storage tube, and the water tank is connected with the central heating system; the mechanism to produce, store and provide the compressed air is to use electricity likely during periods of low energy demand namely off-peak electricity such as at night or electric energy being not easy stored simultaneously recovering the by-produced heat for central heating, to produce and store the high-pressure compressed air pressurizing and inflating the air storage tubes; the brake energy recovery and regeneration device includes a spring reserving-releasing device and/or a compressed air reserving-releasing device as well as a braking energy storage transmission mechanism and an energy release drive transmission mechanism, and they are used to recover the kinetic energy lost during the deceleration and braking of an automobile which is driven by compressed air as power source, and to utilize the recycled energy in starting and accelerating the automobile, to reduce the consumption of compressed air in the air storage tubes used as the automobile driving power; the inner gear ring assembly includes an inner gear ring and, at respective fixed axis innerly meshing with the inner gear ring, a first accelerating gear, a second accelerating gear, a flywheel front inner meshing gear, a plurality of acting gears and a plurality of reset gears; wherein the plurality of acting gears are respectively in transmission connection with the cylinder-combined engines via the clutch transmission devices, the first accelerating gear is in transmission connection with the spring reserving-releasing device via the clutch transmission device, the second acceleration gear is in transmission connection with the compressed air reserving-releasing device via the clutch transmission device, the flywheel front inner meshing gear is driven by the rotation of the inner gear ring to rotate and is in transmission connection with a flywheel to output the rotating torque of the inner gear ring to the flywheel, and the plurality of reset gears are driven by the rotation of the inner gear ring to rotate and can return the torque back to the cylinder-combined engines via the clutch transmission devices respectively; the clutch transmission devices are connected with the controller; the controller is a computerized automatic control system, connected with different parts of the system economically using compressed air as automobile power source, to coordinate and control their operations.

In this invention, the air storage tube is a long tube-type high-pressure compressed air storage device, the air storage tube wall is made of high-pressure resistant material, with its diameter less than the inner diameter of the conventional automobile compressed air storage tank in the prior art, and for the same material it can store the compressed air under higher pressure; one end of the air storage tube is sealed, while another end of the air storage tube is equipped with an air storage tube inlet/exhaust valve controlled by the controller; the air storage tube inlet/exhaust valve can be connected with the bent tube high-pressure compressed air storage via an air storage tube inflation valve to inflate the air storage tube with high-pressure compressed air, the air storage tube inlet/exhaust valve is connected with an air storage tube exhaust duct via which communicating with the cylinder-combined engines to exhaust compressed air to the cylinder-combined engines; the air storage tube is coiled together, or naturally extended along the orientation of the car frame and chassis, and a protective shell is arranged outside the air storage tube; one of the air storage tubes can provide one or more cylinder-combined engines with the compressed air, while one cylinder-combined engine can be filled from one or more air storage tubes;

In this invention, each cylinder-combined engine includes a first cylinder and a second cylinder; each of the first cylinder and the second cylinder comprises a cylinder cavity, a piston, a piston rod and a long tube-type sliding barrel; wherein one end of the cylinder cavity is an open end and another end is a closed end; a space of each cylinder cavity near the closed end is called as the closed end space; wherein the closed end space of the first cylinder is called as first cylinder closed end space, and the closed end space of the second cylinder is called as second cylinder closed end space; the piston is arranged in a sliding mode between the open end and a blocking member outside the closed end space; one end of the sliding barrel is fixed in connection with the open end while another end is provided with a buffering shock-absorbing device with a vent communicated with the atmosphere; one end of the piston rod is connected to the outside of the piston, while another end with a stopping terminal outstretches from the open end of the cylinder cavity, is accommodated in the sliding barrel and can move translationally within the sliding barrel; each of two opposing sides of the piston rod is provided with a rack, respectively meshing with a piston rod upper gear and a piston rod lower gear; wherein the piston rod upper gear of the first cylinder is called as first cylinder piston rod upper gear, the piston rod upper gear of the second cylinder is called as second cylinder piston rod upper gear, the piston rod lower gear of the first cylinder is called as first cylinder piston rod lower gear, and the piston rod lower gear of the second cylinder is called as second cylinder piston rod lower gear; the piston rod upper gear is in transmission connection with acting gears via the clutch transmission device; the piston rod lower gear is in transmission connection with the reset gears via the clutch transmission device;

In this invention, the lengths of the cylinder cavities of the first cylinder and the second cylinder are identical, while the lengths of the first cylinder closed end space and the second cylinder closed end space are also identical;

The first cylinder closed end space is equipped with a first cylinder inlet valve and a first cylinder exhaust valve controlled by the controller, while the second cylinder closed end space is equipped with a second cylinder inlet valve and a second cylinder exhaust valve controlled by the controller; the first cylinder inlet valve is communicated with the air storage tube inlet/exhaust valve via the air storage tube exhaust duct, an electric heater and a heat preservation thermal insulation layer are arranged around the air storage tube exhaust duct and the first cylinder closed end space; while the second cylinder inlet valve is communicated with the first cylinder exhaust valve, and the second cylinder exhaust valve is communicated with the atmosphere;

The inner diameter of the cylinder cavity of the first cylinder is less than that of the cylinder cavity of the second cylinder, and the both satisfy the following relation:

$$r_1 = \sqrt{(mn-1)/u} \times r_2$$

In the formula, $r_1$ is the radius of the cylinder cavity of the first cylinder, $r_2$ is the radius of the cylinder cavity of the second cylinder, n is the pressure (bar) of compressed air inflated from the air storage tubes to the first cylinder closed end space, m is the increasing ratio of absolute temperature of compressed air entering the first cylinder closed end space after heated by the electric heater, namely air expansion ratio, u is the times of length of the cylinder cavity to that of its closed end space.

Preferably, the water tank is a water container, with its water inlet interlinked to a to-be-heated water source, and a water outlet communicated with an underground buried insulation pipe of the central heating system; the bent tube-type high-pressure compressed air storage is a bent coiled tub-type structure in the water tank, with tube wall made of high pressure resistant material, and the tube diameter is less than the inner diameter of the conventional compressed air storage device in the same capacity, thus under the same material conditions the bent tube-type high-pressure compressed air storage is favorable for storing the compressed air with higher pressure, and the bent tube-type high-pressure compressed air storage is favorable for exchanging heat with cooling water outside the tubes; an inlet orifice of the bent tube-type high-pressure compressed air storage is used to receive the high-pressure compressed air from the air compressor exhaust valve, while an outlet orifice of the bent tube-type high-pressure compressed air storage is connected with an air inflation machine used to pressurize and inflate the air storage tubes onboard.

Preferably, the boiler-type HCAPS device can be large, medium and small according to the volume; the boiler-type HCAPS device generally refers to the large scale arranged at a main-station producing compressed air also as a heat source and supplying compressed air for the air storage tubes on the automobiles; medium boiler-type HCAPS device is movably connected with the ground facilities, can be hoisted onto an auto trailer to transport between the main-station where the medium boiler-type HCAPS device is pressurized and inflated with air by the air compressor and a sub-station where the compressed air in the medium boiler-type HCAPS device is to inflate the air storage tubes on the automobiles; small boiler-type HCAPS device uses a home air compressor during the night when electricity is off peak to pressurize and inflate the bent tube-type high-pressure compressed air storage with air and the in-home running water used as cooling water is heated in the water tank and then converged to a household system of hot water and/or home heating pipelines, the air pressure in the bent tube-type high-pressure compressed air storage of the small boiler-type HCAPS device is higher than the rated air pressure in the air storage tubes mounted on an automobile and the volume of the bent tube-type high-pressure compressed air storage of the small boiler-type HCAPS device is greater than that of one of the automobile-mounted air storage tubes.

Preferably, the spring reserving-releasing device includes a push rod, a cylindrical spiral compression spring, a cylindrical spiral tensile spring, a first chain wheel, a second chain wheel, a chain and a spring tightening mechanism; the compression spring and the tensile spring are fixedly connected to two ends of the push rod respectively; the push rod is accommodated into a long barrel type push rod chamber to move translationally; a guide sleeve is additionally arranged outside the cylindrical spiral compression spring, a sleeve is additionally arranged outside the cylindrical spiral tensile spring, while the guide sleeve and the sleeve are respectively fixedly connected to two ends of the push rod chamber; the push rod can move longitudinally within the guide sleeve under the action of an external force; each of two opposing sides of the push rod is provided with a rack, respectively meshing with a push rod upper gear and a push rod lower gear; the translational movement of the push rod and the rotation of the push rod upper gear and the push rod lower gear can interact and drive with each other; a controllable blocking mechanism is arranged in the push rod chamber, and is used for blocking or releasing the translational movement of the push rod toward the side of the tension spring; the first chain wheel and the second chain wheel are on the same side and respectively fixed on the outer end of the compression spring and the outer end of the tension spring; the chain is the one with a fixed length, and its two ends penetrate respectively through the inner-hollow spaces of the cylindrical spiral compression spring and the cylindrical spiral tension spring, and are connected with both ends of the push rod; the main part of the chain is positioned outside the push rod chamber and meshed with the first chain wheel and the second chain wheel; the spring tightening mechanism is a polygonal bolt-type protruding object, in transmission connection with the first chain wheel via the clutch transmission device, and the spring tightening mechanism can be directionally screwed by a torque wrench and drives the first chain wheel via the clutch transmission device to rotate and then to pull the push rod moving translationally toward the side of the compression spring, so that the compression spring is compressed, the tension spring is elongated, and the elastic potential energy produced by elastic deformation is stored therein; when the controllable blocking mechanism let go the push rod can reset in a translational movement toward the side of the tensile spring under the elastic action; the rotation of the push rod lower gear can also drive the push rod to move translationally toward the side of the compression spring, compressing the compression spring and stretching the tensile spring to make them produce elastic deformation and store the spring elastic potential energy, meanwhile the push rod lower gear is in transmission connection with the braking energy storage transmission mechanism via the clutch transmission device, used to participate in the braking energy storage transmission; the push rod, when moving translationally toward the side of the tensile spring to release the stored spring elastic potential energy, can drive the push rod upper gear to rotate, which is in transmission connection with the first accelerating gear via the clutch transmission device, and then outputs torque toward the flywheel via the inner gear ring assembly, starting the energy release drive transmission mechanism.

Preferably, the compressed air reserving-releasing device comprises a spring cylinder, a pneumatic piston and a pneumatic push rod; the spring cylinder includes a spring cylinder cavity, an inflation valve and a helical spring, wherein the gas medium within the spring cylinder cavity has a set initial air pressure, the inflation valve is arranged at the end of the spring cylinder cavity, used for pre-inflating the spring cylinder cavity with air to the set initial air pressure, and the helical spring is arranged between the end of the spring cylinder cavity and the inner side of the pneumatic piston in the spring cylinder cavity; the pneumatic piston is in a sliding fit with the inner wall of the spring cylinder cavity, the outer side of the pneumatic piston is connected to the pneumatic push rod; the pneumatic push rod is accommodated into a long tube-type motion chamber and can translate longitudinally in the motion chamber under the action of an external force; a guide bracket arranged inside the motion chamber guides the translational movement of the pneumatic push rod within the motion chamber; controllable blocking mechanisms are arranged segmentally on the inner wall of the motion chamber, used to block or release the end of the pneumatic push rod to move translationally toward outside spring cylinder; each of two opposing sides of the pneumatic push rod is provided with a rack, respectively meshing with a pneumatic push rod upper gear and a pneumatic push rod lower gear; the translational movement of the pneumatic push rod and the rotation of the pneumatic push rod upper gear and the pneumatic push rod lower gear can interact and drive with each other; the rotation of the pneumatic push rod lower gear can also drive the pneumatic push rod to move translationally toward inside spring cylinder, compressing the air medium in it and the helical spring to store the potential energies of air pressure and spring elasticity, meanwhile the pneumatic push rod lower gear is in transmission connection with the braking energy storage transmission mechanism via the clutch transmission device, used to participate in the braking energy storage transmission; the pneumatic push rod, when moving translationally toward outside spring cylinder to release the stored potential energies of air pressure and spring elasticity, can drive the pneumatic push rod upper gear to rotate, which is in transmission connection with the second accelerating gear via the clutch transmission device, and then outputs torque toward the flywheel via the inner gear ring assembly, starting the energy release drive transmission mechanism.

Preferably, the boiler-type HCAPS device, the air storage tubes and the cylinder-combined engine form a pneumatic transmission system; the boiler-type HCAPS device and/or the air storage tubes are used as the air source device of the pneumatic transmission system; the cylinder-combined engine is used as a pneumatic actuator to convert the air energy into mechanical energy; wherein the boiler-type HCAPS device, as a air source, can also provide compressed air for a pneumatic torque wrench as its power to twist the spring tightening mechanism, so that the automobile-mounted spring reserving-releasing device stores elastic potential energy for later use, and/or the spring cylinder of the automobile-mounted compressed air reserving-releasing device is supplemented with compressed air if necessary to maintain the initial air pressure therein and the reserving-releasing function thereof.

Preferably, the braking energy storage transmission mechanism is that a brake shaft is provided beside the conventional transmission shaft, including an overrunning clutch with a function of torque one-way transmission and a torque limiter with a function of overload protection added onto the transmission shaft, a tooth chain joining the formation of the clutch transmission device between the transmission shaft and the brake shaft, a tooth chain wheel, a brake gearbox and a brake driving wheel arranged on the brake shaft, moreover, the brake driving wheel is respectively in transmission connection with the push rod lower gear and/or the pneumatic push rod lower gear via the clutch transmission device; in this way, when the automobile starts, accelerates and runs, the power transmission process of the energy release drive transmission mechanism is as follows, the torque transmitted from the flywheel, a clutch and a gearbox in the conventional automobile power transmission process can be continuously forward transmitted through the overrunning clutch and the torque limiter to the transmission shaft, a differential mechanism, a half axle and a driving wheels to drive an automobile; while the automobile decelerates and brakes, the power transmission process of the braking energy storage transmission mechanism is as follows, the torque of the driving wheels is completely transmitted to the brake shaft through the half axle, the differential mechanism, the transmission shaft, the torque limiter, the tooth chain and the tooth chain wheel, but the torque cannot be reversely transmitted through the overrunning clutch backward to the gearbox, and the torque limiter plays a role in overload protection for torque transmission to the brake shaft, thus the torque transmitted to the brake shaft is further transmitted through the brake gearbox and the brake driving wheel respectively to the push rod lower gear and/or the pneumatic push rod lower gear via the clutch transmission device, as a result, the push rod moves in translational towards the side of the compression spring and/or the pneumatic push rod moves in translational towards inside spring cylinder, to perform the braking energy storage.

Preferably, there are two sets of the cylinder-combined engines; the plurality of acting gears include a first acting gear, a second acting gear, a third acting gear, and a fourth acting gear, wherein the first acting gear and the second acting gear are respectively in transmission connection via the clutch transmission device with the first cylinder piston rod upper gear and the second cylinder piston rod upper gear in one set of cylinder-combined engine; the third acting gear and the fourth acting gear are respectively in transmission connection via the clutch transmission device with the first cylinder piston rod upper gear and the second cylinder piston rod upper gear in another set of cylinder-combined engine; the first acting gear, the second acting gear, the third acting gear, the fourth acting gear, as well as the first accelerating gear and the second accelerating gear are in symmetrical arrangement within the inner gear ring, and transmit their respective rotating torques to the inner gear ring, which collaboratively gathers the torques, mixes the power and output the torque to the flywheel via the flywheel front inner meshing gear;

Correspondingly, the plurality of reset gears include a first reset gear, a second reset gear, a third reset gear and a fourth reset gear, which are also in symmetrical arrangement within the inner gear ring, but rotate under the driving of the rotation of the inner gear ring and reversely transmit the torque to the piston rod lower gear of each cylinder in time respectively via the clutch transmission device to promote a timely return stroke of each cylinder piston rod; wherein the first reset gear and second reset gear are respectively in transmission connection with the first cylinder piston rod lower gear and the second cylinder piston rod lower gear in one set of cylinder-combined engine via the clutch transmission device to respectively promote the two respective cylinder piston rods for the return stroke in time; the third reset gear and fourth reset gear are respectively in transmission connection with the first cylinder piston rod lower gear and the second cylinder piston rod lower gear in another set of cylinder-combined engine via the clutch transmission device to respectively promote the two respective cylinder piston rods for the return stroke in time;

The torque transmitted from the rotation of the acting gears to the inner gear ring made by each cylinder power stroke is significantly greater than that consumed from the rotation of the inner gear ring for the rotation of the reset gears to drive each cylinder return stroke, so that the inner gear ring can output sufficient surplus torque to the flywheel.

Preferably, the mechanical transmission which can be connected or disconnected in the clutch transmission devices can be axis parallel gears combined transmission, bevel gear pair and/or chain transmission;

The clutch transmission devices comprise:

The first clutch transmission device, divided into a first clutch transmission device A and a first clutch transmission device B, where the first clutch transmission device A is arranged between the first cylinder piston rod upper gear and the first acting gear, used to control the switch between the connected or disconnected states to transmit the torque from the first cylinder piston rod upper gear to the first acting gear; the first clutch transmission device B is arranged between the second cylinder piston rod upper gear and the second acting gear, used to control the switch between the connected or disconnected states to transmit the torque from the second cylinder piston rod upper gear to the second acting gear;

The second clutch transmission device, divided into a second clutch transmission device A and a second clutch transmission device B, where the second clutch transmission device A is arranged between the first cylinder piston rod lower gear and the first reset gear, used to control the switch between the connected or disconnected states to transmit the torque from the first reset gear to the first cylinder piston rod lower gear; the second clutch transmission device B is arranged between the second cylinder piston rod lower gear and the second reset gear, used to control the switch between the connected or disconnected states to transmit the torque from the second reset gear to the second cylinder piston rod upper gear;

The third clutch transmission device, arranged between the push rod upper gear and the first accelerating gear, used to control the switch between the connected or disconnected states to transmit the torque from the push rod upper gear to the first accelerating gear;

The fourth clutch transmission device, arranged between the pneumatic push rod upper gear and the second accelerating gear, used to control the switch between the connected or disconnected states to transmit the torque from the pneumatic push rod upper gear to the second accelerating gear;

The fifth clutch transmission device, arranged between the brake driving wheel and the push rod lower gear, used to control the switch between the connected or disconnected states to transmit the torque from the brake driving wheel to the push rod lower gear;

The sixth clutch transmission device, arranged between the brake driving wheel and the pneumatic push rod lower gear, used to control the switch between the connected or disconnected states to transmit the torque from the brake driving wheel to the pneumatic push rod lower gear;

The seventh clutch transmission device, arranged between the spring tightening mechanism and the first chain wheel, used to control the switch between the connected or disconnected states to transmit the torque from the spring tightening mechanism to the first chain wheel;

The eighth clutch transmission device, arranged between the transmission shaft and the brake shaft, used to control the switch between the connected or disconnected states to transmit the torque from the transmission shaft to the brake shaft.

In this invention, the connected or disconnected mechanical transmission mechanisms of the first clutch transmission device and the connected or disconnected mechanical transmission mechanisms of the second clutch transmission device are identical in structure, but opposite in torque transmission direction; one end of them is the inner ring assembly where each acting gears and each reset gears are identical in radius, tooth shape and tooth number, while another end is the cylinder-combined engine where each piston rod upper gears and each piston rod lower gears are identical in radius, tooth shape and tooth number, in addition, the piston rods of the first cylinder and the second cylinder are identical in length, moreover the racks on the two opposite sides of the piston rods of the first cylinder and the second cylinder are identical in length, tooth shape and tooth number, and such structures are advantageous for the controller to respectively control the first clutch transmission devices and the second clutch transmission devices to be switched periodically and orderly between the connected and disconnected states, to make each of the first cylinder and the second cylinder repeat transformation between the power stroke and the return stroke, and in each cylinder-combined engine the power stroke of the first cylinder is synchronous with the return stroke of the second cylinder, and then the return stroke of the first cylinder is synchronous with the power stroke of the second cylinder, alternatively.

In this invention, a method for the system economically using compressed air as automobile power source includes the following steps:

Step 1: at the main-station, aforementioned producing and supplying compressed air station, the boiler-type HCAPS device is pressurized and inflated by the air compressor utilizing off-peak electricity during night or wind power and solar energy power which is not easy to store, and the control system regulates the emission from the air compressor to the bent tube-type high-pressure compressed air storage adapted to the flow of cooling water entering the water tank, so that a large amount of air is compressed in the bent tube-type high-pressure compressed air storage, and pressurized to the predefined high pressure and stored for later use, meanwhile, the cooling water is heated to the predefined higher temperature and converged to the central heating system.

Step 2: control system timely regulating the flow rate and velocity of high-pressure compressed air from the bent tube-type high-pressure compressed air storage in the boiler-type HCAPS device into the automobile-mounted air storage tubes so that the compressed air in the air storage tubes reaches the set pressure without a major change in temperature during the air inflation process.

Step 3: when the automobile starts or accelerates, the spring reserving-releasing device and/or compressed air reserving-releasing device and its energy release drive transmission mechanism starts, the cylinder-combined engines powered by compressed air and their transmission mechanism work simultaneously to drive the automobile beginning to run.

Step 4: during the automobile runs, each cylinder-combined engine completes the following steps under the control of the controller:

S11, at the moment before the power stroke in the first cylinder, the piston in the first cylinder abuts beside the blocking member outside the first cylinder closed end space, the air storage tube inlet/exhaust valve and the first cylinder inlet valve are opened while the first cylinder exhaust valve is in the closed state, and the high-pressure compressed air injected from the air storage tubes to the first cylinder closed end space is heated by the electric heater around the exhaust duct of the air storage tube and the electric heater around the first cylinder closed end space to increase the air pressure greatly; meanwhile, both of the second cylinder inlet valve and the second cylinder exhaust valve are in a closed state, and the stopping terminal of the piston rod in the second cylinder abuts against the buffering shock-absorbing device.

S12, the air storage tube inlet/exhaust valve and the first cylinder inlet valve immediately closed while the first cylinder exhaust valve remains closed, the high-pressure compressed air that has been injected into the first cylinder closed end space pushes the piston and the piston rod of the first cylinder to move towards the outside of the piston where it is the atmosphere pressure, the pressure difference between inside and outside the piston is great, strongly promoting the power stroke in the first cylinder, the piston rod of the first cylinder translationally moves outward driving the first cylinder piston rod upper gear acting rotation and transmitting the torque via the first clutch transmission device A which is in the connected state to the first acting gear to rotate and drive the rotation of the inner gear ring, and meanwhile the second clutch transmission device A is in the disconnected state so that the first cylinder piston rod lower gear is in lower gear idling;

At this moment, the second reset gear rotating along with the inner gear ring drives, through the second clutch transmission device B which is in the connected state at this time, the second cylinder piston rod lower gear to reset rotation, promoting the return stroke of the piston rod in the second cylinder, since at the moment the second cylinder inlet valve is closed while the second cylinder exhaust valve is opened and communicated directly with the atmosphere, the resistance to the return stroke in the second cylinder is very small, and the first clutch transmission device B is in the disconnected state, so that the second cylinder piston rod upper gear is in upper gear idling;

In this process, the torque produced by the rotation of the first acting gear and transmitted to the inner gear ring is significantly greater than that consumed from the rotation of the inner gear ring for driving the second reset gear to rotate, so that the torque obtained by the inner gear ring can be output in a high ratio via the flywheel front inner meshing gear to the flywheel.

S13, in the first cylinder at the moment just before the power stroke ends and the return stroke is about to begin, the stopping terminal of the piston rod abuts against the buffering shock-absorbing device; at the same time, in the second cylinder at the moment just before the return stroke ends and the power stroke is about to begin, the piston abuts beside the blocking member outside the second cylinder closed end space; at this time, the first clutch transmission device A, the first clutch transmission device B, the second clutch transmission device A and the second clutch transmission device B are all in the disconnected states, the first cylinder inlet valve remains closed, the second cylinder exhaust valve is immediately closed, and the first cylinder exhaust valve and the second cylinder inlet valve are then opened and communicated with each other directly, so that the compressed air which retains a certain pressure in the first cylinder is quickly spread through the opened first cylinder exhaust valve and second cylinder inlet valve into the second cylinder closed end space.

S14, then both the second clutch transmission device A and the first clutch transmission device B are in the connected states;

At this moment the first cylinder inlet valve remains closed, and the first cylinder exhaust valve and the second cylinder inlet valve are continuously opened and communicated with each other, the first reset gear rotating along with the inner gear ring drives, through the second clutch transmission device A which is in connected state at this time, the first cylinder piston rod lower gear to reset rotation, promoting the return stroke of the piston rod in the first cylinder, while the first clutch transmission device A is in the disconnected state, so that the first cylinder piston rod upper gear is in upper gear idling;

At the same time, the second cylinder exhaust valve remains closed, wile the second cylinder inlet valve and the first cylinder exhaust valve are continuously opened and communicated with each other, the pressure of the compressed air in the second cylinder closed end space is higher than that of atmosphere pressure outside the piston of the second cylinder, promoting the piston and the piston rod in the second cylinder to translationally move outwards, starting the power stroke in the second cylinder, and the piston rod of the second cylinder translationally moving outward drives the second cylinder piston rod upper gear acting rotation transmitting the torque via the first clutch transmission device B which is in the connected state to the second acting gear to rotate and drive the rotation of the inner gear ring, meanwhile the second clutch transmission device B is in the disconnected state so that the second cylinder piston rod lower gear is in lower gear idling;

At this time the second cylinder closed end space is communicated with the cylinder cavity of the first cylinder, and because the radius $r_2$ of the cylinder cavity of the second cylinder is greater than the radius $r_1$ of the cylinder cavity of the first cylinder, $r_2 > r_1$, and $r_1 = \sqrt{(mn-1)/u} \times r_2$ times of $r_1$, the area of the piston of the second cylinder is significantly greater than that of the first cylinder, the pushing force of the power stroke in the second cylinder is significantly greater than the resistance of the return stroke in the first cylinder; in the process, the torque transmitted from the rotation of the second acting gear to the inner gear ring made by the power stroke in the second cylinder is significantly greater than that consumed from the rotation of the inner gear ring for the rotation of the first reset gear to drive the return stroke in the first cylinder, so that the inner gear ring can have a certain torque to output via the flywheel front inner meshing gear to the flywheel; moreover, when the return stroke in the first cylinder and the power stroke in the second cylinder end simultaneously, the air pressure both in the first cylinder closed end space and in the cylinder cavity of the second cylinder drops to that close to the atmosphere pressure, then the piston of the first cylinder abuts beside the blocking member outside the first cylinder closed end space while the stopping terminal of the piston rod of the second cylinder abuts against the buffering shock-absorbing device.

S15, it repeats step S11.

Step 5: when the automobile decelerates and/or brakes, the spring reserving-releasing device and/or compressed air reserving-releasing device and the braking energy storage transmission mechanism thereof work, to convert the kinetic energy reduced during the automobile decelerates and/or brakes into the potential energy for storage, and to convert the potential energy back into the automobile kinetic energy when the automobile starts and/or accelerates.

The Beneficial Effects

In this invention, the air storage tubes in the compressed air power device can store sufficient amount of higher pressure compressed air, the cylinder-combined engines comprising the first and second cylinders matching in interconnection (including the specified relationship between radiuses of the two cylinder cavities) can make full use of driving force produced by compressed air, and via the inner gear ring assembly effectively transmit and output torques and power.

In this invention, the boiler-type high-pressure compressed air production and storage device (boiler-type HCAPS device) can collect a large amount of thermal energy by-produced during the production process (usually about 90% of electrical energy is converted into heat during the production of compressed air by air compressor) to use for central heating. Moreover, the extensive use of off-peak electricity during night, or wind power and solar energy power which is not easy to store, to produce and store high-pressure compressed air into automobile-mounted air storage tubes, offers an economical energy source of compressed air.

Common sense and mechanics reveal that a cylindrical structure in a smaller diameter has a better capacity to bear pressure, in this invention tube-type (in a relatively smaller diameter) devices applied for air store. The bent tube-type high-pressure compressed air storage is advantageous in production and storage of higher pressure compressed air, and also in heat exchange with cooling water in water tank, while the tube structure of automobile-mounted air storage tubes is advantageous to increase the energy of high-pressure compressed air on board.

In this invention, the bent tube-type high-pressure compressed air storage has significantly higher pressure and larger capacity of compressed air than one of the automobile-mounted air storage tubes, making it is possible that in the air storage tubes the trend of air temperature-drop, caused by the discharge amount of compressed air from the bent tube-type high-pressure compressed air storage into the automobile-mounted air storage tubes accompanying its pressure-drop and air temperature-drop, can buffer the trend of temperature-rise, caused by the air already in the air storage tubes compressed resulting in its pressure-rise and air temperature-rise, via controlling the air flow velocity from the bent tube-type high-pressure compressed air storage into the automobile-mounted air storage tubes to keep the temperature relatively stable and avoid the reduction of the energy storage in the air storage tubes.

In this invention, the spring reserving-releasing device and/or compressed air reserving-releasing device can sufficiently recover and regenerate the kinetic energy lost during deceleration and braking of a compressed air driven automobile and then use for re-starting and accelerating the automobile, to effectively save compressed air consumption during its driving.

In view of overall efficiency analysis, this invention provides a system for economical use of compressed air as an automobile power source.

Figure 1:
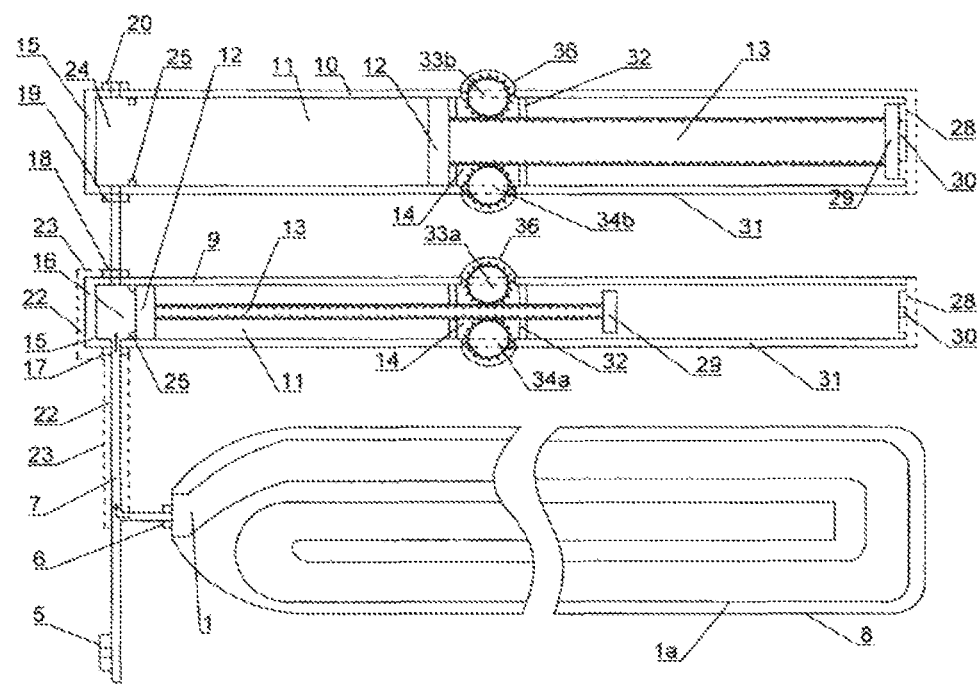
FIG. 1 is a structural diagram of the cylinder-combined engine when compressed air is injected from air storage tubes into the first cylinder closed end at a moment just before the first cylinder power stroke and second cylinder return stoke start, in Embodiment of this invention.
Figure 2:
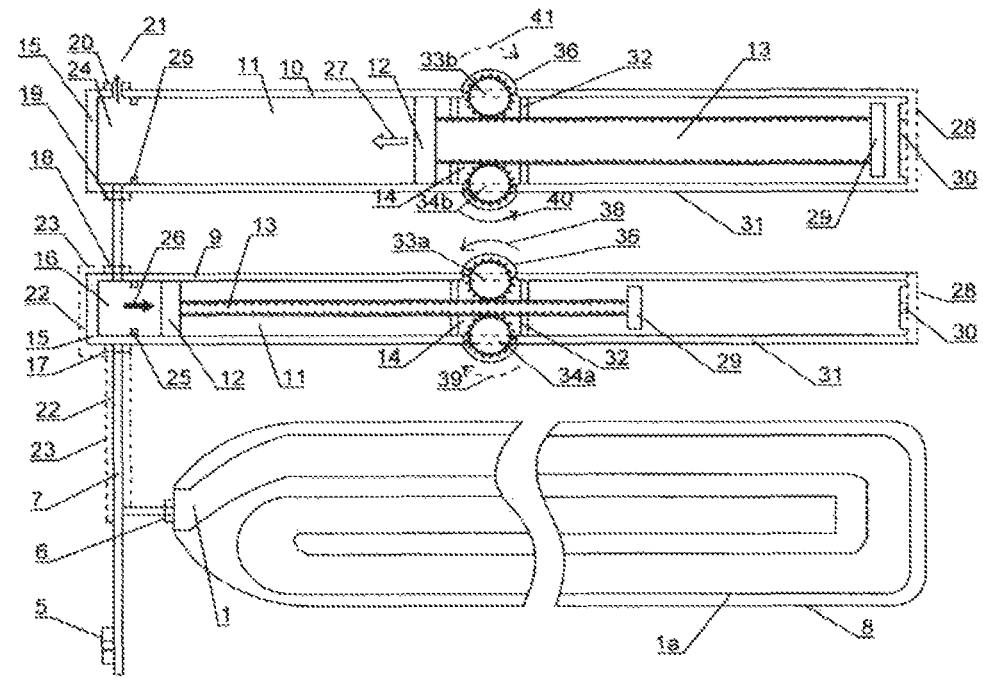
FIG. 2 is a structural diagram of the cylinder-combined engine when the first cylinder power stroke and second cylinder return stoke simultaneously proceed, in Embodiment of this invention.
Figure 3:
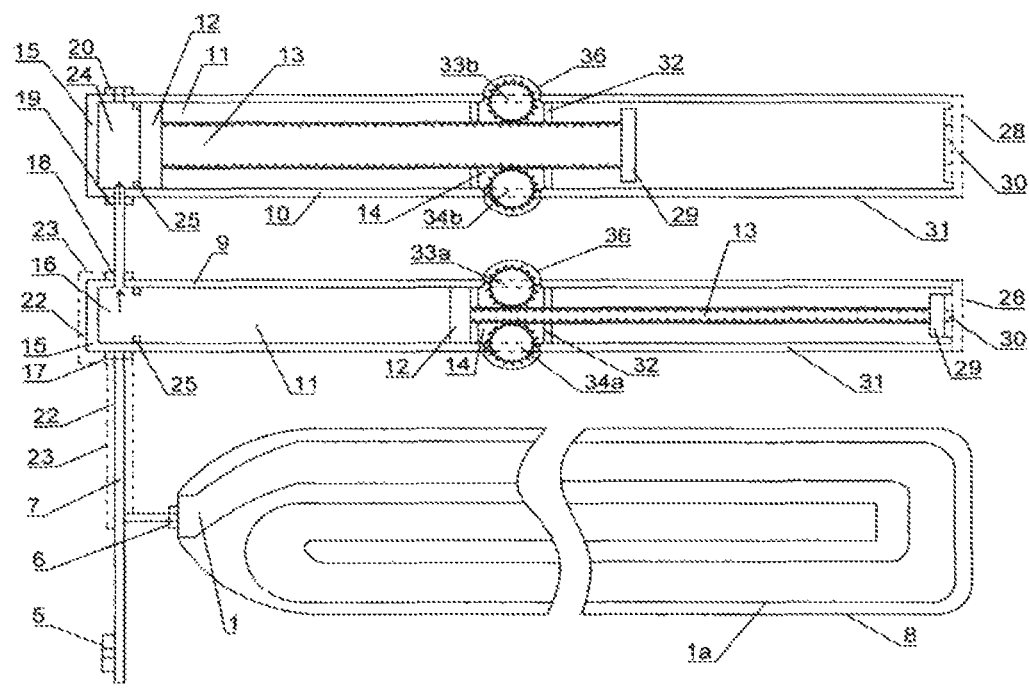
FIG. 3 is a structural diagram of the cylinder-combined engine when compressed air is injected from the first cylinder into the second cylinder closed end at a moment just before the second cylinder power stroke and first cylinder reset stoke start after the first cylinder power stroke and second cylinder return stoke simultaneously end, in Embodiment of this invention.
Figure 4:
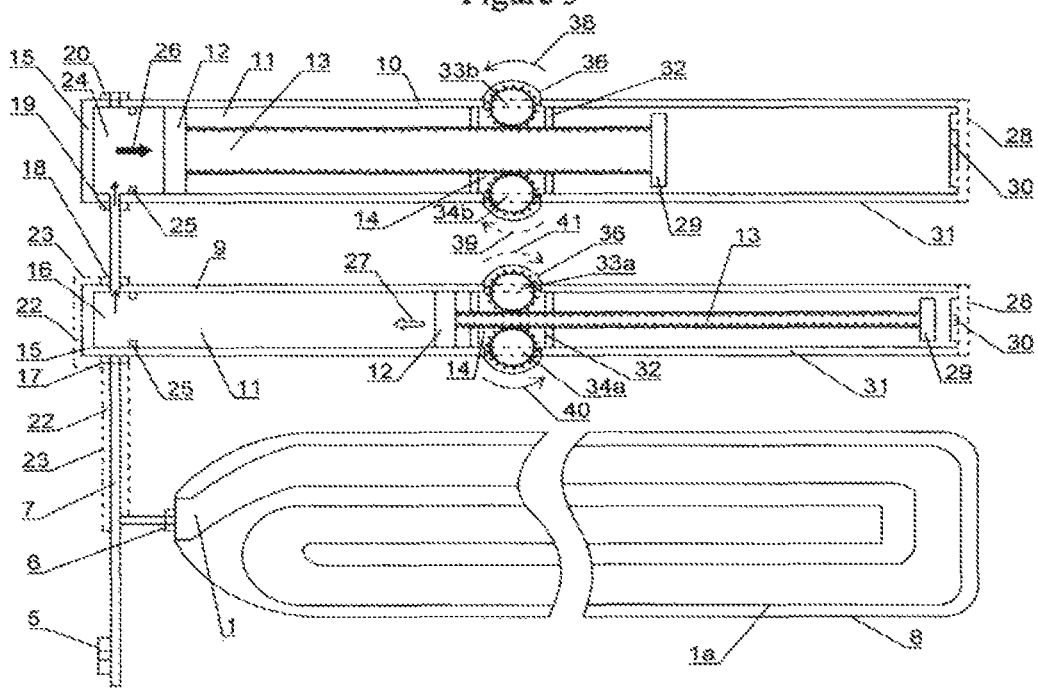
FIG. 4 is a structural diagram of the cylinder-combined engine when the first cylinder return stroke and second cylinder power stoke simultaneously proceed, in Embodiment of this invention.
Figure 5A:
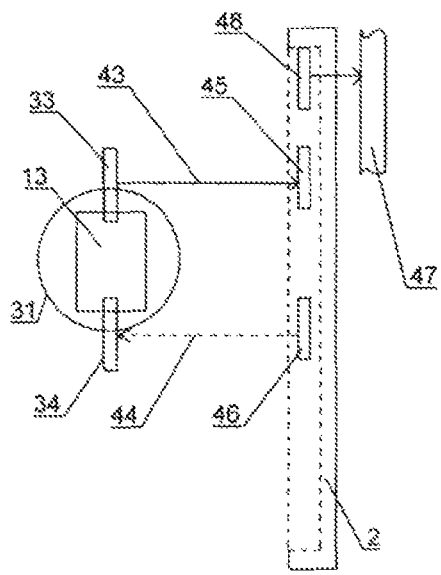
FIG. 5a is a side view of torque transmission between the piston rod upper/lower gears and the acting/reset gears of the inner gear ring assembly in Embodiment of this invention.
Figure 5B:
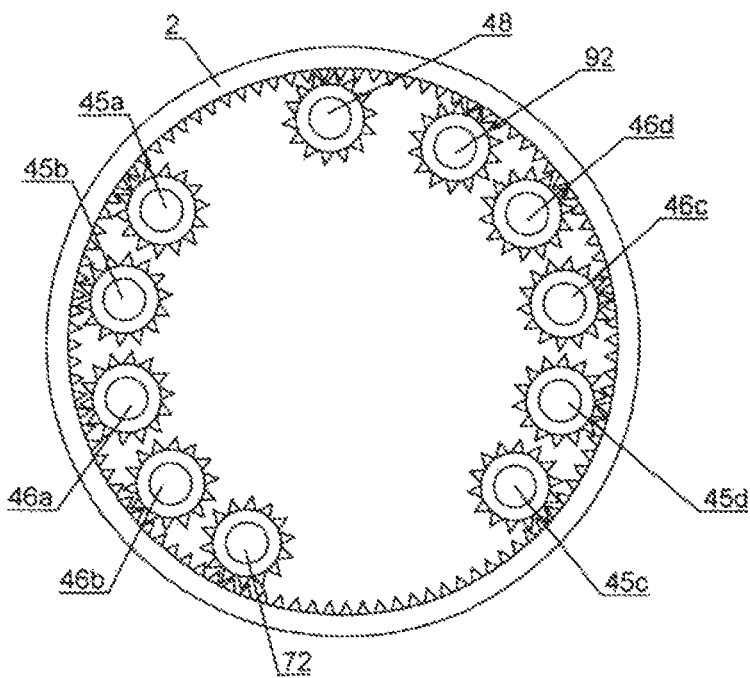
FIG. 5b is a front view of the inner gear ring assembly in Embodiment of this invention.
Figure 6A:
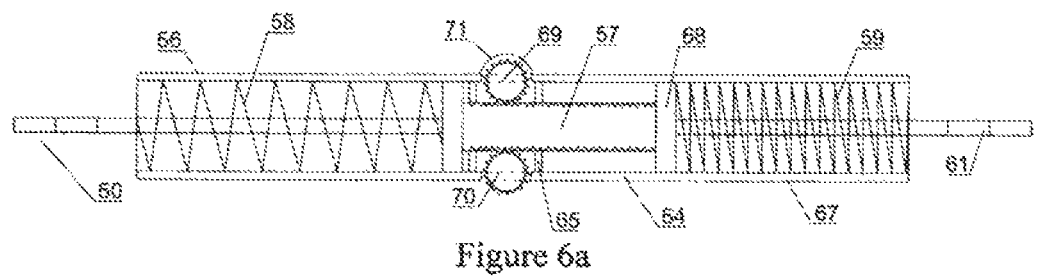
FIG. 6a is a side view of the spring reserving-releasing device without occurring elastic deformation, in Embodiment of this invention.
Figure 6B:
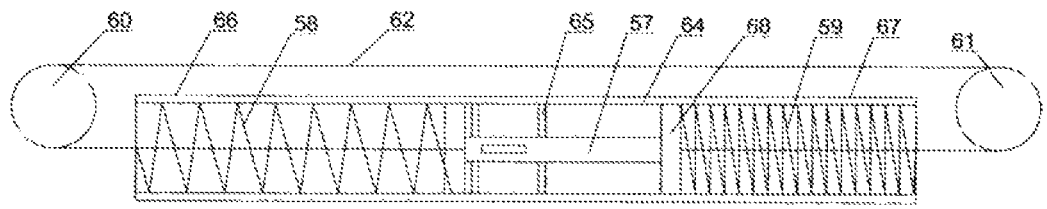
FIG. 6b is a top view of the spring reserving-releasing device without occurring elastic deformation, in Embodiment of this invention.
Figure 7A:
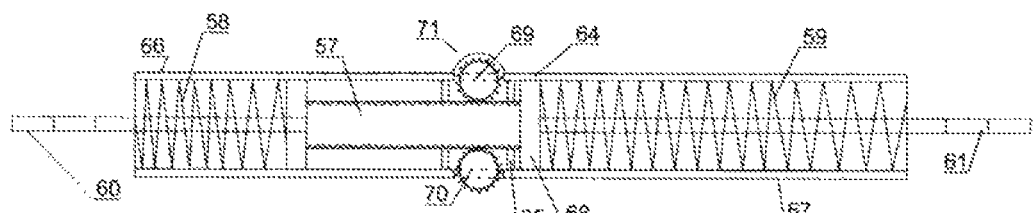
FIG. 7a is a side view of the spring reserving-releasing device while storing elastic potential energy, in Embodiment of this invention.
Figure 7B:
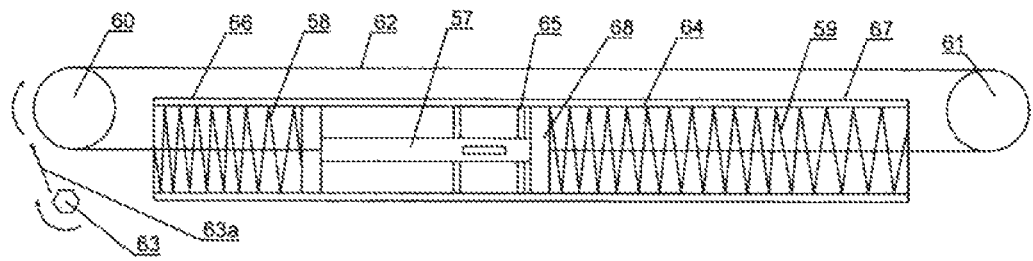
FIG. 7b is a top view of the spring reserving-releasing device while storing elastic potential energy, in Embodiment of this invention.

Wherein, 1, air storage tubes; 1*a*, air storage tube wall; 2, inner gear ring; 3, automobile-mounted device; 4, boiler-type HCAPS device; 5, air storage tube inflation valve; 6, air storage tube inlet/exhaust valve; 7, exhaust duct; 8, protective shell; 9, first cylinder; 10, second cylinder; 11, cylinder cavity; 12, piston; 13, piston rod; 14, open end; 15, closed end; 16, first cylinder closed end space; 17, first cylinder inlet valve; 18, first cylinder exhaust valve; 19, second cylinder inlet valve; 20, second cylinder exhaust valve; 21, atmosphere; 22, electric heater; 23, heat preservation thermal insulation layer; 24, second cylinder closed end space; 25, blocking member; 26, power stroke; 27, return stroke; 28, vent; 29, stopping terminal; 30, buffering shock-absorbing device; 31, sliding barrel; 32, first guide bracket; 33, piston rod upper gear; 33*a,* first cylinder piston rod upper gear; 33*b*, second cylinder piston rod upper gear; 34, piston rod lower gear; 34*a*, first cylinder piston rod lower gear; 34*b*, second cylinder piston rod lower gear; 36, first shield; 38, acting rotation; 39, lower gear idling; 40, reset rotation; 41, upper gear idling; 43, first clutch transmission device; 43*a*, first clutch transmission device A; 43*b*, first clutch transmission device B; 44, second clutch transmission device; 44a, second clutch transmission device A; 44b, second clutch transmission device B; 45, acting gears; 45a, first acting gear; 45b, second acting gear; 45c, third acting gear; 45d, fourth acting gear; 46, reset gears; 46a, first reset gear; 46b, second reset gear; 46c, third reset gear; 46d, fourth reset gear; 47, flywheel; 48, flywheel front inner meshing gear; 49, clutch; 50, gearbox; 51, overrunning clutch; 52, torque limiter; 53, transmission shaft; 54, differential mechanism; 55, half axle; 56, driving wheel; 57, push rod; 58, compression spring; 59, tension spring; 60, first chain wheel; 61, second chain wheel; 62, chain; 63, spring tightening mechanism; 63a, seventh clutch transmission device; 64, push rod chamber; 65, second guide bracket; 66, guide sleeve; 67, sleeve; 68, large end; 69, push rod upper gear; 69a, third clutch transmission device; 70, push rod lower gear; 71, second shield; 72, first accelerating gear; 73, tooth chain; 73a, eighth clutch transmission device; 74, tooth chain wheel; 75, brake shaft; 76, brake gearbox; 77, brake driving wheel; 78, fifth clutch transmission device; 79, pneumatic push rod; 80, spring cylinder cavity; 81, pneumatic piston; 82, helical spring; 83, spring cylinder; 84, inflation valve; 85, toward inside spring cylinder; 86, motion chamber; 87, guide bracket; 88, toward outside spring cylinder; 89, pneumatic push rod upper gear; 89a, fourth clutch transmission device; 90, pneumatic push rod lower gear; 91, sixth clutch transmission device; 92, second accelerating gear; 94, water tank; 95, bent tube-type high-pressure compressed air storage; 96, water inlet; 97, water outlet; 98, air compressor; 99, underground buried insulation pipe; 100, inlet orifice; 101, outlet orifice; 102, exhaust valve; 103, electric motor; 104, air compressor inlet orifice; 105, air compressor outlet orifice; 106, air compressor inlet valve; 107, air compressor cylinder piston; 108, cylinder cavity on left side of air compressor cylinder piston; 109, cooling water; 110, hot water; 111, tube wall; 112, water source.

Specific Embodiments

Hereinafter, this invention will be described further in detailed embodiments referring to the drawings. The following embodiments illustrate this invention but are not intended to limit the scope of this invention.

In the description of the this invention, it is necessary to illustrate, unless expressive rules and limits, the term "connection" should have a general understanding, for example, it can be a fixed connection, also a detachable connection, or a integrated connection; it can be connected directly, also indirectly through intermediaries; it can be an electric connection, also a communication connection. For ordinary technical personnel in the field, the specific meaning of the term in this invention can be understood according to the particular cases.

As shown in FIG. 1-12, this embodiment describes a system economically using compressed air as automobile power source, comprising a compressed air power device, a mechanism to produce, store, provide compressed air, brake energy recovery and regeneration devices, an inner gear ring assembly, clutch transmission devices and a controller.

The compressed air power device includes one or more air storage tubes (1) on an automobile and one or more cylinder-combined engines for using the compressed air to produce driving power;

The mechanism to produce, store and provide the compressed air includes a boiler-type high-pressure compressed air production and storage device, abbreviated as boiler-type HCAPS device (4), and an air compressor (98), the working pressure of the air compressor (98) is close to, equal to or exceeds 100 Mpa; the boiler-type HCAPS device (4) consists of a water tank (94) and a bent tube-type high-pressure compressed air storage (95); the bent tube-type high-pressure compressed air storage (95) is arranged inside the water tank (94), with its one end connected with the air compressor (98) and another end with air inflation equipment to connect with the air storage tube (1), while the water tank (94) is connected with the central heating system; the mechanism to produce, store and provide the compressed air is to use electricity during periods of low energy demand (off-peak) such as at night or electric energy being not easy stored for producing and storing the high-pressure compressed air while simultaneously recovering the by-produced heat for central heating, and pressurizing and inflating the air storage tubes (1).

The brake energy recovery and regeneration device includes a spring reserving-releasing device and/or a compressed air reserving-releasing device as well as a braking energy storage transmission mechanism and an energy release drive transmission mechanism, and they are used to recover the kinetic energy lost during the deceleration and braking of an automobile using compressed air as driving source for its reuse in starting and accelerating the automobile, to reduce the consumption of compressed air in the air storage tubes (1) used as the automobile driving power.

The inner gear ring assembly includes an inner gear ring (2) and, at fixed axis innerly meshing with the inner gear ring (2), a first accelerating gear (72), a second accelerating gear (92), a flywheel front inner meshing gear (48), a plurality of acting gears (45) and a plurality of reset gears (46); wherein the plurality of acting gears (45) are respectively in transmission connection with the cylinder-combined engines via the clutch transmission devices, the first accelerating gear (72) is in transmission connection with the spring reserving-releasing device via the clutch transmission device, the second acceleration gear (92) is in transmission connection with the compressed air reserving-releasing device via the clutch transmission device, the flywheel front inner meshing gear (48) is driven by the rotation of the inner gear ring (2) to rotate and is in transmission connection with a flywheel (47) to output the rotating torque of the inner gear ring (2) to the direction of the flywheel (47); and the plurality of reset gears (46) are driven by the rotation of the inner gear ring (2) to rotate and can return the torque back to the cylinder-combined engines.

The clutch transmission devices comprise: first clutch transmission device (43), second clutch transmission device (44), third clutch transmission device (69a), fourth clutch transmission device (89a), fifth clutch transmission device (78), sixth clutch transmission device (91), seventh clutch transmission device (63a), eighth clutch transmission device (73a), and they are the mechanic transmission mechanisms, respectively placed between cylinder-combined engines, spring reserving-releasing, compressed air reserving-releasing device and inner gear ring assembly, which can be connected or disconnected under the control of the clutches communicated by the controller. The controller is used to control the performance of the above devices equipped with a computerized automatic control system, such as Controller Area Network-BUS.

As shown in FIGS. 1-4 and 5a, the air storage tube (1) is a long tube-type high-pressure compressed air storage device, and the air storage tube wall (1a) is made of high-pressure resistant material to store the high high-pressure compressed air under a pressure ≥30 MPa, with its diameter less than the inner diameter of the conventional automobile compressed air storage tank in the prior art, and for the same material it can store the compressed air under higher pressure. The size of the tube diameter adapts to the pressure needed to store the compressed air, and the tube length to its volume according to the design. The total volume designed for the automobile-mounted high-pressure compressed air storage can be achieved by a plurality of the volumes of several air storage tubes (1) added together. One end of each air storage tube (1) is sealed, while another end of the air storage tube (1) is equipped with an air storage tube inlet/exhaust valve (6), connected to the air storage tube inflation valve (5) for receiving the high-pressure compressed air inflated from the bent tube high-pressure compressed air storage (95), and also connected with the air storage tube exhaust duct (7) communicating with the cylinder-combined engines to exhaust compressed air to the cylinder-combined engines. Each of the air storage tube (1) can be coiled together, or naturally extended along the orientation of the car frame and chassis, and equipped with the protective shell (8). Each of the air storage tubes (1) can provide one or more cylinder-combined engines with the compressed air, while one cylinder-combined engine can be filled from one or more air storage tubes (1).

As shown in FIGS. 1-4 and 5a, each cylinder-combined engine consists of a first cylinder (9) and a second cylinder (10); each of the first cylinder (9) and the second cylinder (10) comprises a cylinder cavity (11), a piston (12), a piston rod (13) and a long tube-type sliding barrel (31); wherein one end of the cylinder cavity (11) is an open end (14) and another end is a closed end (15); a space of each cylinder cavity (11) near the closed end (15) is called as the closed end space; wherein the closed end space of the first cylinder (9) is called as first cylinder closed end space (16), and the closed end space of the second cylinder (10) is called as second cylinder closed end space (24); the piston (12) is arranged in a sliding mode between the open end (14) and a blocking member (25) outside the closed end space; one end of the sliding barrel (31) is fixed in connection with the open end (14) while another end is provided with a buffering shock-absorbing device (30) with a vent (28) communicated with the atmosphere (21); one end of the piston rod (13) is connected to the outside of the piston (12), while another end with a stopping terminal (29) outstretches from the open end (14) of the cylinder cavity (11), is accommodated in the sliding barrel (31) and can move translationally within the sliding barrel (31); on the inner wall of the sliding barrel (31) and the open end (14) a first guide bracket (32) is equipped to facilitate the piston rod (13) moving translationally within the sliding barrel (31); each of two opposing sides of the piston rod (13) is provided with a rack, respectively meshing with a piston rod upper gear (33) and a piston rod lower gear (34); wherein the piston rod upper gear (33) of the first cylinder (9) is called as first cylinder piston rod upper gear (33a), the piston rod upper gear (33) of the second cylinder (10) is called as second cylinder piston rod upper gear (33b), the piston rod lower gear (34) of the first cylinder (9) is called as first cylinder piston rod lower gear (34a), and the piston rod lower gear (34) of the second cylinder (10) is called as second cylinder piston rod lower gear (34b). The translation of the piston rod (13) and the rotations of the piston rod upper gear (33) and the piston rod lower gear (34) can act and transmit with each other, wherein the translation of the piston rod (13) toward the outer side of the cylinder, as the power stroke (26), is in transmission connection with the acting rotation (38) of the piston rod upper gear (33), which is further in transmission connection with the rotation of the acting gears (45), internally mashing with the inner gear ring (2),via the first clutch transmission device (43), while the reset gears (46), internally mashing with the inner gear ring (2), is in transmission connection, via the second clutch transmission device (44), with the reset rotation (40) of the piston rod lower gear (34), which is in transmission connection with the translation of the piston rod (13) toward the inner side of the cylinder as the return stroke (27).The piston rod upper gear (33) and the piston rod lower gear (34) are positioned closely against the outside of the open end (14) of the cylinder cavity (11), where a part of the sliding barrel (31) is absent, of which a shield, termed as first shield (36), is instead covering the peripheries of the piston rod upper gear (33) and the piston rod lower gear (34). The first shield (36) continues with the sliding barrel (31); wherein the piston rods (13) of the first cylinder (9) and the second cylinder (10) are identical in length, the racks on their two opposite sides are identical in length, tooth shape and tooth number, each piston rod upper gears (33) and each piston rod lower gears (34) are identical in radius, tooth shape and tooth number; the lengths of the cylinder cavities (11) of the first cylinder (9) and the second cylinder (10) are identical, while the lengths of the first cylinder closed end space (16) and the second cylinder closed end space (24) are also identical.

As shown in FIGS. 1-4, the first cylinder closed end space (16) is equipped with a first cylinder inlet valve (17) and a first cylinder exhaust valve (18), while the second cylinder closed end space (24) is equipped with a second cylinder inlet valve (19) and a second cylinder exhaust valve (20), The first cylinder inlet valve (17) is communicated with the air storage tube inlet/exhaust valve (6) via the air storage tube exhaust duct (7), an electric heater (22) and a heat preservation thermal insulation layer (23) are arranged around the air storage tube exhaust duct (7) and the first cylinder closed end space (16); while the second cylinder inlet valve (19) is communicated with the first cylinder exhaust valve (18), and the second cylinder exhaust valve (20) is open to the atmosphere (21);

The inner diameter of the cylinder cavity (11) of the first cylinder (9) is less than that of the cylinder cavity (11) of the second cylinder (10), and the both satisfy the following relation:

$$r_2 = \sqrt{(mn-1)/u} \times r_1$$

where $r_1$ is the radius of the cylinder cavity (11) of the first cylinder (9), $r_2$ is the radius of the cylinder cavity (11) of the second cylinder (10), n is the pressure (bar) of compressed air inflated from the air storage tubes (1) to the first cylinder closed end space (16), m is the increasing ratio of absolute temperature of compressed air entering the first cylinder closed end space (16) after heated by the electric heater (22), namely, air expansion ratio, u is the times of length of the cylinder cavity (11) to that of its closed end space.

Therefore, after the first cylinder (9) and the second cylinder (10), communicating with each other in the cylinder-combined engine, completes a work cycle, the pressure of the waste air in the cavity of second cylinder (10) to exhaust to the atmosphere is close to the atmospheric pressure, so that the pressure potential of the high-pressure compressed air can be fully utilized every time when it is injected from the air storage tubes (1) into the first cylinder closed end space (16).

Figure 12:
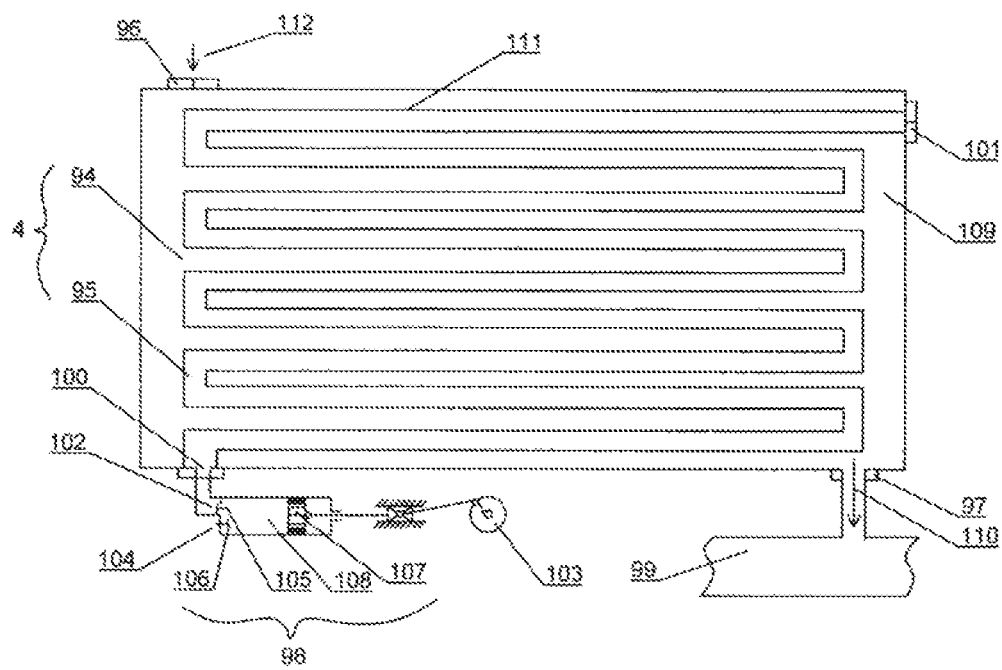
FIG. 12 is a diagram of boiler-type device producing and storing high-pressure compressed air (boiler-type HCAPS device) in Embodiment of this invention.

As shown in FIG. 12, the boiler-type HCAPS device (4) can be large, medium and small according to the volume, respectively arranged at the main-stations (producing compressed air and as a heat source), sub-stations for the compressed air inflation and empower; wherein the boiler-type HCAPS device (4) generally refers to the large scale. The main-stations producing compressed air include one or more boiler-type HCAPS devices (4), high/ultra-high pressure air compressor (98), pneumatic torque wrench, inflation machine for the automobile air storage tubes, and one or more medium boiler-type high-pressure compressed air storage devices, and it should be built at a place near the cooling water, easy for automobile inflation and empower, especially where it is qualified for utilizing off-peak electricity during night or wind power and solar energy power which is not easy to store and needed for central heating system. The sub-stations can be built at the place where there is a need for automobile inflation but shortage in the cooling water or while it is unqualified for utilizing off-peak electricity during night or wind power and solar energy power which is not easy to store.

As shown in FIG. 12, the boiler-type HCAPS device (4) consists of a water tank (94) and a bent tube-type high-pressure compressed air storage (95). The water tank (94) is a large-scale water container, with its water inlet (96) interlinked to a to-be-heated water source (112), and a water outlet (97) communicated with an underground buried insulation pipe (99) of the central heating system. The bent tube-type high-pressure compressed air storage (95) is a bent coiled tubular structure in the water tank (94), with tube wall (111) made of high pressure resistant material, and tube diameter is less than the inner diameter of the conventional compressed air gas storage device in the same capacity, thus under the same material conditions the bent tube-type high-pressure compressed air storage (95) is favorable for storing the compressed air with higher pressure and exchanging heat with cooling water (109) outside the tubes. The size of the tube diameter adapts to the pressure needed to store the compressed air, and the tube length to its volume according to the design, to allow the bent tube high-pressure compressed air storage (95) for storing a large amount of high-pressure compressed air. The bent tube-type high-pressure compressed air storage (95) is equipped with an inlet orifice (100) and an outlet orifice (101), respectively communicated with an exhaust valve (102) of the high/ultra-high pressure air compressor and an automobile inflation machine. As shown in FIG. 12, the high/ultra-high pressure air compressor is a volumetric piston-type air compressor (98), hereinafter referred to as air compressor, driven by a motor (103). The working pressure (i.e., output pressure) of air compressor (98) is a high/ultra-high (close or equal to or more than 100 MPa). The air compressor inlet orifice (104) is communicated to the atmosphere through air filter and air dryer (not shown in figures), and the air compressor outlet orifice (105) is communicated with the inlet orifice (100) of the bent tube-type high-pressure compressed air storage (95). The air compressor inlet orifice (104) and air compressor outlet orifice (105) are respectively equipped with an air compressor inlet valve (106) and an air compressor exhaust valve (102), both are positioned on one side of the air compressor cylinder piston (107), set as left side. When the air compressor cylinder piston (107) moves rightward, the air pressure in the cylinder cavity on left side of air compressor cylinder piston (108) is lower than the atmospheric pressure, and so the inlet valve (106) is opened for the air under atmospheric pressure to inhale through the filter, dehydrate through the dryer, and enter the cylinder cavity on left side of air compressor cylinder piston (108). When the air compressor cylinder piston (107) moves leftward, the inlet valve (106) is closed under the pressure of compressed air in the cylinder cavity on left side of air compressor cylinder piston (108). When the air pressure in the cylinder cavity on left side of the piston (108) is increased to the extent slightly higher than the air pressure in the bent tube high-pressure compressed air storage (95), the air compressor exhaust valve (102) is opened for the compressed air to inflate the bent tube high-pressure compressed air storage (95). The control system control the emission rate of air compressor (98) adapted to the flow rate and velocity of the cooling water (109) in the water tank (94) to take away with it the large amount of heat produced orderly during the compression of a large amount of air into the bent tube high-pressure compressed air storage (95) up to a set high pressure, meanwhile the cooling water (109) is heated to be the hot water (110) at a set high temperature, flowing from the water outlet (97) of the water tank (94) into the underground buried insulation pipe (99) of the central heating system.

The medium boiler-type HCAPS device has the same structure and functions as the large scale device, that is, consisting of a water tank (94) and a bent tube-type high-pressure compressed air storage (95). The major differences are: 1) the size and shape of a medium boiler-type HCAPS device is relatively smaller, suitable for the transportation by an auto trailer; 2) the medium boiler-type HCAPS device is flexibly set with the ground facilities, dismountable to take away. At the main-stations (producing compressed air and as heat source), after the air compressor (98) completes the inflation and pressurization process for it, the medium boiler-type HCAPS device can be lifted onto the trailer to transport to the sub-station for inflating the automobile-mounted air storage tubes (1), and when the air pressure in the medium boiler-type HCAPS device drops to a certain value after many times of such inflating, so it can be transported back to the main-stations where the air is compressed into it once more, and replaced by the one ready for use after completing this process.

The small boiler-type HCAPS device is a small household device, consisting of a smaller water tank (94) and bent tube-type high-pressure compressed air storage (95). It can use a home air compressor during the night when electricity is off peak to pressurize and inflate the bent tube-type high-pressure compressed air storage (95) and the in-home running water used as cooling water (109) is heated in the water tank (94) and then converged to a household system of hot water (110) and/or home heating pipelines, the air pressure in the bent tube-type high-pressure compressed air storage (95) of the small boiler-type HCAPS device is higher than the rated air pressure in the air storage tubes (1) mounted on an automobile and the volume of the small boiler-type HCAPS device (4) is greater than that of one of the automobile-mounted air storage tubes (1).

As shown in FIGS. 5(a), 5(b), 6(a), 6(b), 7(a), 7(b), 10 and 11, the spring reserving-releasing device includes a push rod (57), a cylindrical spiral compression spring (58), a cylindrical spiral tensile spring (59), a first chain wheel (60), a second chain wheel (61), a chain (62) and a spring tightening mechanism (63). The push rod (57) is a solid square bar, of which the two ends are fixedly connected to the compression spring (58) and the tensile spring (59), respectively, in an arrangement of Compression Spring-Push rod-Tension Spring. The push rod (57) is accommodated into a long barrel type push rod chamber (64) to move translationally, and equipped with a second guide bracket (65) to facilitate a steady translation of the push rod (57) within the push rod chamber (64). A guide sleeve (66) is additionally arranged outside the cylindrical spiral compression spring (58) to ensure its stability during its elastic deformation, and a sleeve (67) is additionally arranged outside the cylindrical spiral tensile spring (59) to avoid something foreign matter into the gap between spring coils produced when the cylindrical spiral tensile spring (59) is stretched by an external force. The guide sleeve (66) and the sleeve (67) are respectively fixedly connected to two ends of the push rod chamber (64), combined to be a lengthened solid cylindrical structure and fixed to a suitable part of the automobile body. Two kinds of nuts with special internal threads are tightly screwed on the outer ends of the cylindrical spiral compression spring (58) and cylindrical spiral tensile spring (59), respectively, wherein the former nut (not shown in any of the figures) has an internal thread corresponding to that of the outer end supporting coils (also termed as dead coils, several of which are tightened with each other to play a role in supporting instead of be involved in deformation) of the cylindrical spiral compression spring (58), and the latter nut (not shown in any of the figures) has an internal thread corresponding to that of the outer end coils (the several of spiral rings tightened to each other when the tensile spring was produced) of cylindrical spiral tensile spring (59). The two nuts on the outer ends of the cylindrical spiral compression spring (58) and cylindrical spiral tensile spring (59) are respectively fixed to the two opening ends of the lengthened solid cylindrical structure, keeping open the internal space of the two springs toward their respective outer ends without being blocked. The inner ends of the cylindrical spiral compression spring (58) with a polished end face is fixedly connected with one end of the push rod (57) (keeping the supporting end face of compression spring perpendicular to its axis). On the inner ends of the cylindrical spiral tensile spring (59), a plug (with an external thread corresponding to the internal thread of the cylindrical spiral inner space) is screwed into its inner space and fixedly connected with another end of the push rod (57) (the inner ends of the cylindrical spiral tensile spring (59) is not in hook connection to avoid producing the unnecessary bending stress and affecting the spring strength). The axis of the compression spring (58), the longitudinal central line of the push rod (57) and axis of the tensile spring (59) are sequentially connected in a straight line, called the total longitudinal central line. The cross-sectional diameter of the push rod (57) is smaller than the inner diameter of the guide sleeve (66), so that the push rod (57) can move longitudinally within the guide sleeve (66) under the action of an external force. Each of two opposing sides of the push rod (57) is provided with a rack, respectively meshing with a push rod upper gear (69) and a push rod lower gear (70); the translational movement of the push rod (57), and the rotation of the push rod upper gear (69) and the push rod lower gear (70) can interact and drive with each other; The push rod upper gear (69) and push rod lower gear (70) are positioned closely against the inner side of the the cylindrical spiral compression spring (58), where a part of the push rod chamber (64) is absent, of which a shield, termed as second shield (71), is instead covering the peripheries of the push rod upper gear (69) and push rod lower gear (70). The second shield (71) continues with the push rod chamber (64). An end of the push rod (57) is large end (68), fixedly concocted with the inner end of the tensile spring (59). A controllable blocking mechanism is arranged in the push rod chamber (64), and is used for the large end (68) to move translationally toward the side of the tensile spring (59) for the action of blocking or releasing. The first chain wheel (60) and the second chain wheel (61) are respectively fixed on the outer end of the compression spring (58) and one side of the outer end of the tension spring (59), and the root circles of the first chain wheel (60) and second chain wheel (61) are respectively tangential to the line extended from the two ends of the total longitudinal central line. The chain (62) is the one with a fixed length, and the diameter of its cross-sectional circumscribed circle is smaller than the inner diameter of the cylindrical spiral compression spring (58) and the cylindrical spiral tension spring (59), thus able to penetrate through their inner-hollow spaces moving freely along the spring axis. The main part of the chain (62) is positioned at the one side of the arrangement of the Compression Spring-Push Rod-Tension Spring and outside the push rod chamber (64), wherein its two ends respectively mesh and revolve the first chain wheel (60) and the second chain wheel (61) to be connected with the two ends of the push rod (57). The spring tightening mechanism (63) is a polygonal bolt-type protruding object, and fixed at the center of a small solid gear. The seventh clutch transmission device (63a) is arranged between the spring tightening mechanism (63) and the first chain wheel (60). When the seventh clutch transmission device (63a) is connected, the spring tightening mechanism (63) can be directionally screwed by a torque wrench and drives the first chain wheel (60) to rotate and then to pull the push rod (57) moving translationally toward the side of the compression spring (58), so that the compression spring (58) is compressed, the tension spring (59) is elongated. When the controllable blocking mechanism in the push rod chamber (64) stops the reset translation of the large end (68) toward the side of tension spring (69), the elastic potential energy produced by such elastic deformation is stored in the compression spring (58) compressed and the tension spring (59) elongated. When the controllable blocking mechanism in the push rod chamber (64) lets the reset translation of the large end (68) go toward the side of tension spring (69), the push rod (57) moves translationally toward the side of the tension spring (59) to drive the push rod upper gear (69) rotating, and via the connected third clutch transmission device (69a) transmits the torque to the first accelerating gear (72), internally meshing with the inner gear ring (2), to participate in the energy release of the brake energy recovery and regeneration device to drive the operation of the transmission mechanism. The push rod lower gear (70) receives the torque to rotate from the brake driving wheel (77) of braking energy storage transmission mechanism in the brake energy recovery and regeneration device and drive the push rod (57) to move translationally toward the side of the compression spring (58), compressing the compression spring (58) and stretching the tension spring (59). When the controllable blocking mechanism in the push rod chamber (64) stops the reset translation of the large end (68) toward the side of tension spring (69), the elastic potential energy produced by such elastic deformation is stored in the compression spring (58) compressed and the tension spring (59) elongated. Moreover, the push rod upper gear (69) and push rod lower gear (70) participate in the operation of the energy release drive transmission mechanism and the braking energy storage transmission mechanism in the brake energy recovery and regeneration device, and are jointly cooperated with the pneumatic push rod upper gear (89) and the pneumatic push rod lower gear (90).

Figure 8:
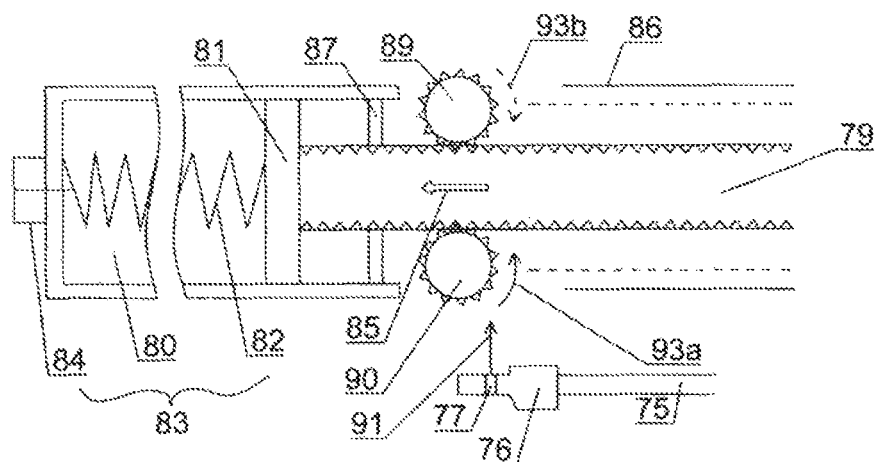
FIG. 8 is a diagram of the compressed air reserving-releasing device receiving the torque from brake driving wheel as to reserve the gas pressure potential energy and spring elastic potential energy in the spring cylinder, in Embodiment of this invention.
Figure 9:
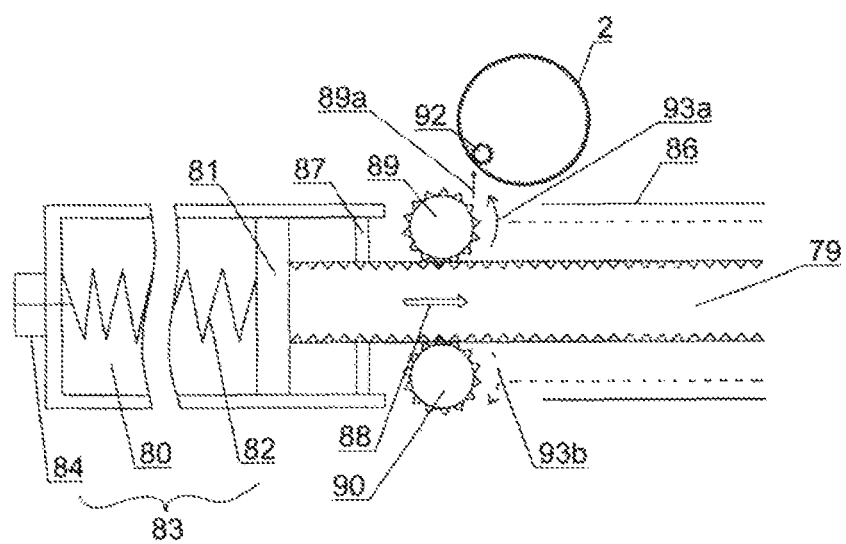
FIG. 9 is a diagram of the compressed air reserving-releasing device releasing the gas pressure potential energy and spring elastic potential energy in the spring cylinder and transmitting the torque to the inner gear ring assembly, in Embodiment of this invention.

As shown in FIGS. 8 and 9, compressed air reserving-releasing device comprises a spring cylinder (83), a pneumatic piston (81) and a pneumatic push rod (79); the spring cylinder (83) includes a spring cylinder cavity (80), an inflation valve (84) and a helical spring (82), wherein the gas medium within the spring cylinder cavity (80) has a set initial air pressure, the inflation valve (84) is placed at the end of the spring cylinder cavity (80), used for pre-inflating the spring cylinder cavity (80) with air to the set initial air pressure, and the helical spring (82) is placed between the end of the spring cylinder cavity (80) and the inner side of the pneumatic piston (81) in the spring cylinder cavity (80). The pneumatic piston (81) is in a sliding fit with the inner wall of the spring cylinder cavity (80), the outer side of the pneumatic piston (81) is connected to the pneumatic push rod (79); the pneumatic push rod (79) is accommodated into a long tube-type motion chamber (86) and can translate longitudinally in the motion chamber (86) under the action of an external force, a guide bracket (87) arranged inside the motion chamber (86) guides the translational movement of the pneumatic push rod (79) within the motion chamber (86). Each of two opposing sides of the pneumatic push rod (79) is provided with a rack, respectively meshing with a pneumatic push rod upper gear (89) and a pneumatic push rod lower gear (90); the translational movement of the pneumatic push rod (79), and the rotation of the pneumatic push rod upper gear (89) and the pneumatic push rod lower gear (90) can interact and drive with each other. The rotation of the pneumatic push rod lower gear (90) can drive the pneumatic push rod (79) to move translationally toward inside spring cylinder (85), compressing the gas medium in it and the helical spring (82) to store the potential energies of gas pressure and spring elasticity. The pneumatic push rod (79), when moving translationally toward the outer side of the spring cylinder (88) to release the stored potential energies of gas pressure and spring elasticity, can drive the pneumatic push rod upper gear (89) to rotate. The controllable blocking mechanisms are arranged segmentally on the inner wall of the motion chamber (86), to block or release the end of the pneumatic push rod (79) to move translationally toward the outer side of spring cylinder (88). The pneumatic push rod upper gear (89) is in transmission connection with the second accelerating gear (92) via the fourth clutch transmission device (89a) to participate in the energy release drive transmission. The pneumatic push rod lower gear (90) is in transmission device connection with the brake driving wheel (77) of the braking energy storage transmission mechanism via the sixth clutch transmission device (91) to participate in the sixth clutch transmission.

In this Embodiment, the basic structure of the compressed air reserving-releasing device has some functions to be similar to those of a granted Chinese patent "Automotive braking energy storage and energy release driving device" (ZL 2012 2 0511195.2) by this inventor: both of them is a kind of the automotive braking energy storage-release driving device, with a single spring cylinder (83) to work independently without any connection with a automobile-mounted air storage device or another cylinder; a helical spring (82) is arranged between the inner side of the pneumatic piston (81) in the spring cylinder cavity (80) and the end of spring cylinder cavity (80) equipped with a inflation valve (84), through which the spring cylinder cavity (80) is inflated to a set initial pressure. There is neither of intake and exhaust valves to the spring cylinder (83), within which the pneumatic piston (81) makes no reciprocating movement, neither frequently nor periodically. The form of its movement is that, when the the pneumatic piston (81) moves translationally inward the spring cylinder (83) (in which the air medium and the helical spring (82) are compressed to store both of the air pressure potential energy and spring elastic potential energy) when the vehicle decelerates or brakes; when it starts or accelerates, the pneumatic piston (81) moves translationally outward the spring cylinder (83) (to release the stored energy).

In this Embodiment, the compressed air reserving-releasing device has some improvements compared to the granted Chinese patent "Automotive braking energy storage and energy release driving device" (ZL 2012 2 0511195.2) by this inventor: in this compressed air reserving-releasing device, fourth clutch transmission device (89a), arranged between the pneumatic push rod upper gear (89) and the second accelerating gear (92), used to control the switch between the connected or disconnected states to transmit the torque from the pneumatic push rod upper gear (89) to the second accelerating gear (92); sixth clutch transmission device (91), arranged between the brake driving wheel (77) and the pneumatic push rod lower gear (90), used to control the switch between the connected or disconnected states to transmit the torque from the brake driving wheel (77) to the pneumatic push rod lower gear (90).

Figure 10:
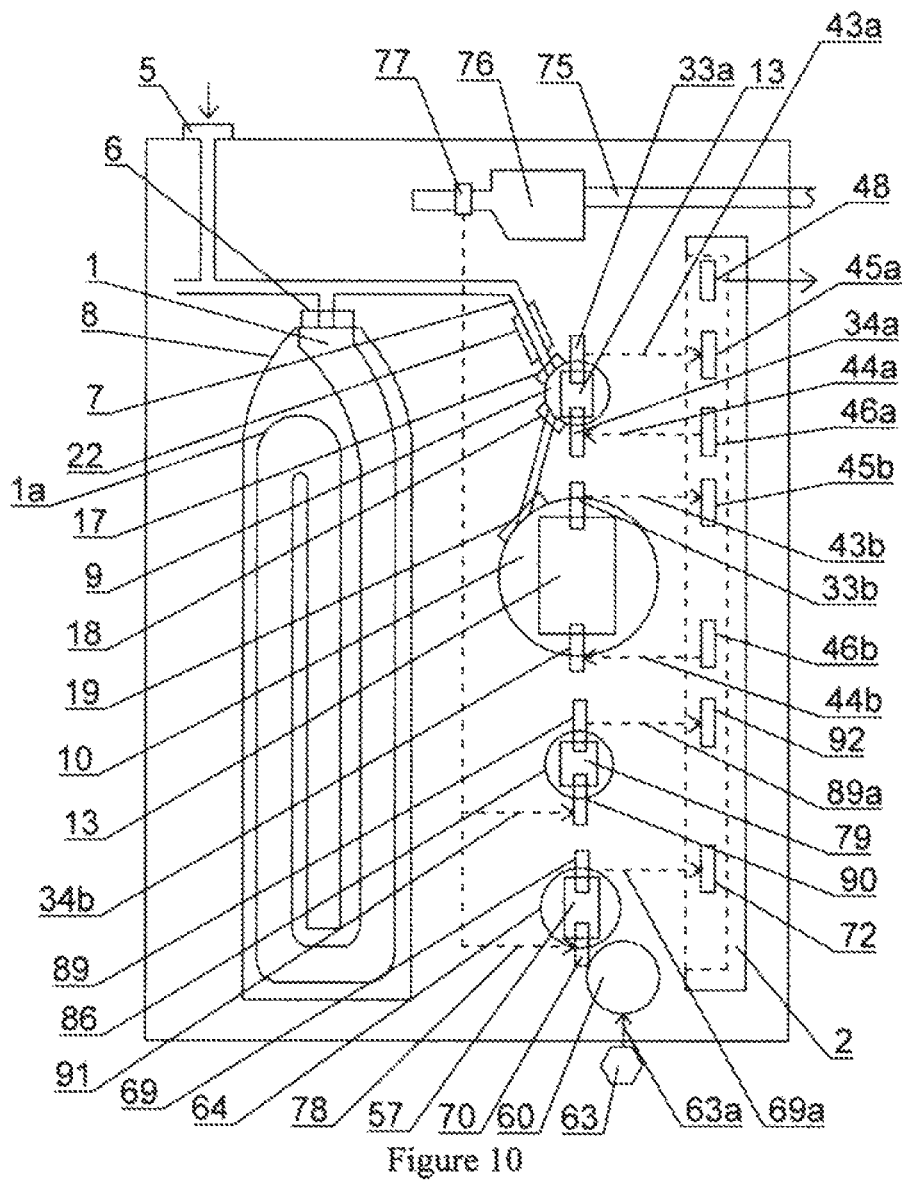
FIG. 10 is a diagram of the automobile-mounted device in Embodiment of this invention.
Figure 11:
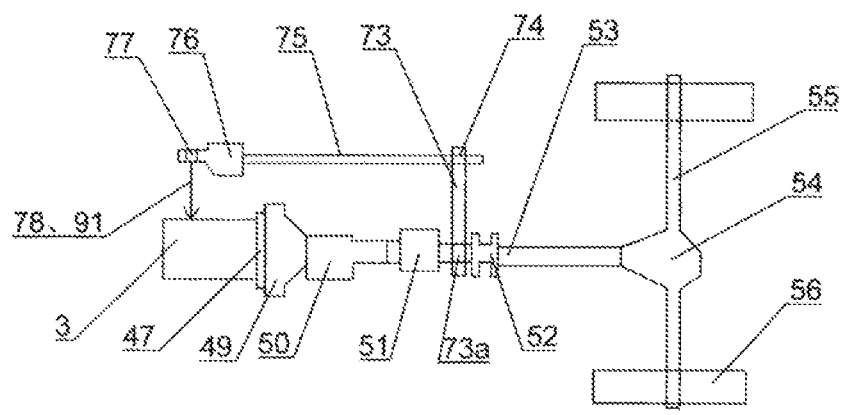
FIG. 11 is a diagram of transmission mechanism for power transmission process, and energy release/storage when driving/braking, in Embodiment of this invention.

As shown in FIGS. 8, 10 and 11, the braking energy storage transmission mechanism is that a brake shaft (75) is provided beside the conventional transmission shaft (53), including an overrunning clutch (51) with a function of torque one-way transmission and a torque limiter (52) with a function of overload protection added onto the transmission shaft (53), a tooth chain (73) joining the formation of the clutch transmission device between the transmission shaft (53) and the brake shaft (75), a tooth chain wheel (74), a brake gearbox (76) and a brake driving wheel (77) arranged on the brake shaft (75), moreover, the brake driving wheel (77) is respectively in transmission connection with the push rod lower gear (70) and/or the pneumatic push rod lower gear (90) via the clutch transmission device; in this way, when the automobile starts, accelerates and runs, the power transmission process of the energy release drive transmission mechanism is as follows, the torque transmitted from the flywheel (47), a clutch (49) and a gearbox (50) in the conventional automobile power transmission process can be continuously forward transmitted through the overrunning clutch (51) and the torque limiter (52) to the transmission shaft (53), a differential mechanism (54), a half axle (55) and a driving wheels (56) to drive an automobile; while the automobile decelerates and brakes, the power transmission process of the braking energy storage transmission mechanism is as follows, the torque of the driving wheels (56) is completely transmitted to the brake shaft (75) through the half axle (55), the differential mechanism (54), the transmission shaft (53), the torque limiter (52), the tooth chain (73) and the tooth chain wheel (74), but the torque cannot be reversely transmitted through the overrunning clutch (51) backward to the gearbox (50), and the torque limiter (52) plays a role in overload protection for torque transmission to the brake shaft (75), thus the torque transmitted to the brake shaft (75) is further transmitted through the brake gearbox (76) and the brake driving wheel (77) respectively to the push rod lower gear (70) and/or the pneumatic push rod lower gear (90) via the clutch transmission device, as a result, the push rod (57) moves in translational towards the side of the compression spring (58) and/or the pneumatic push rod (79) moves in translational towards inside spring cylinder (85), to perform the braking energy storage.

As shown in FIGS. 2, 4, 5a, 5b, 9 and 10, there are two sets of the cylinder-combined engines; the plurality of acting gears (45) include a first acting gear (45a), a second acting gear (45b), a third acting gear (45c), and a fourth acting gear (45d), wherein the first acting gear (45a) and the second acting gear (45b) are respectively in transmission connection via the clutch transmission device with the first cylinder piston rod upper gear (33a) and the second cylinder piston rod upper gear (33b) in one set of cylinder-combined engine; the third acting gear (45c) and the fourth acting gear (45d) are respectively in transmission connection via the clutch transmission device with the first cylinder piston rod upper gear and the second cylinder piston rod upper gear in another set of cylinder-combined engine; the first acting gear (45a), the second acting gear (45b), the third acting gear (45c), the fourth acting gear (45d), as well as the first accelerating gear (72) and the second accelerating gear (92) are in symmetrical arrangement within the inner gear ring (2), and transmit their respective rotating torques to the inner gear ring (2), which collaboratively gathers the torques, mixes the power and output the torque to the flywheel (47) via the flywheel front inner meshing gear (48);

correspondingly, the plurality of reset gears (46) include a first reset gear (46a), a second reset gear (46b), a third reset gear (46c) and a fourth reset gear (46d), which are also in symmetrical arrangement within the inner gear ring (2), but rotate under the driving of the rotation of the inner gear ring (2) and reversely transmit the torque to the piston rod lower gear (34) of each cylinder in time respectively via the clutch transmission device to promote a timely return stroke (27) of each cylinder piston rod (13); wherein the first reset gear (46a) and second reset gear (46b) are respectively in transmission connection with the first cylinder piston rod lower gear (34a) and the second cylinder piston rod lower gear (34b) in one set of cylinder-combined engine via the clutch transmission device to respectively promote the two respective cylinder piston rods (13) for the return stroke (27) in time; the third reset gear (46c) and fourth reset gear (46d) are respectively in transmission connection with the first cylinder piston rod lower gear (34a) and the second cylinder piston rod lower gear (34b) in another set of cylinder-combined engine via the clutch transmission device to respectively promote the two respective cylinder piston rods for the return stroke in time;

the torque transmitted from the rotation of the acting gears (45) to the inner gear ring (2) made by each cylinder power stroke (26) is significantly greater than that consumed from the rotation of the inner gear ring (2) for the rotation of the reset gears (46) to drive each cylinder return stroke (27), so that the inner gear ring (2) can output sufficient surplus torque to the flywheel (47).

As shown in FIGS. 1-4, 7b, and 8-12, the boiler-type HCAPS device (4), the air storage tubes (1) and the cylinder-combined engine form a pneumatic transmission system; the boiler-type HCAPS device (4) and/or the air storage tubes (1) are used as the air source device of the pneumatic transmission system; the cylinder-combined engine is used as a pneumatic actuator to convert the air energy into mechanical energy; wherein the boiler-type HCAPS device (4), as a air source, can also provide compressed air for a pneumatic torque wrench as its power to twist the spring tightening mechanism (63), so that the automobile-mounted spring reserving-releasing device stores elastic potential energy for later use, and/or the spring cylinder (83) of the automobile-mounted compressed air reserving-releasing device is supplemented with compressed air if necessary to maintain the initial air pressure therein and the reserving-releasing function thereof.

As shown in FIGS. 5a, 5b, and 9-11, in this Embodiment, compressed air power device, brake energy recovery and regeneration device, inner ring gear assembly, clutch transmission devices and so on are all the automobile-mounted devices (3), wherein the torque transferring between the cylinder-combined engines, the spring reserving-releasing device, the compressed air reserving-releasing device and the inner ring gear assembly etc. via the clutch transmission devices.

As shown in FIGS. 5, 7(b), 8-11, the mechanical transmission which can be connected or disconnected in the clutch transmission devices can be axis parallel gears combined transmission, bevel gear pair and/or chain transmission;

the clutch transmission devices comprise:

first clutch transmission device (43), divided into a first clutch transmission device A (43a) and a first clutch transmission device B (43b), where the first clutch transmission device A (43a) is arranged between the first cylinder piston rod upper gear (33a) and the first acting gear (45a), used to control the switch between the connected or disconnected states to transmit the torque from the first cylinder piston rod upper gear (33a) to the first acting gear (45a); the first clutch transmission device B (43b) is arranged between the second cylinder piston rod upper gear (33b) and the second acting gear (45b), used to control the switch between the connected or disconnected states to transmit the torque from the second cylinder piston rod upper gear (33b) to the second acting gear (45b);

second clutch transmission device (44), divided into a second clutch transmission device A (44a) and a second clutch transmission device B (44b), where the second clutch transmission device A (44a) is arranged between the first cylinder piston rod lower gear (34a) and the first reset gear (46a), used to control the switch between the connected or disconnected states to transmit the torque from the first reset gear (46a) to the first cylinder piston rod lower gear (34a); the second clutch transmission device B (44b) is arranged between the second cylinder piston rod lower gear (34b) and the second reset gear (46b), used to control the switch between the connected or disconnected states to transmit the torque from the second reset gear (46b) to the second cylinder piston rod upper gear (34b);

third clutch transmission device (69a), arranged between the push rod upper gear (69) and the first accelerating gear (72), used to control the switch between the connected or disconnected states to transmit the torque from the push rod upper gear (69) to the first accelerating gear (72);

fourth clutch transmission device (89a), arranged between the pneumatic push rod upper gear (89) and the second accelerating gear (92), used to control the switch between the connected or disconnected states to transmit the torque from the pneumatic push rod upper gear (89) to the second accelerating gear (92);

fifth clutch transmission device (78), arranged between the brake driving wheel (77) and the push rod lower gear (70), used to control the switch between the connected or disconnected states to transmit the torque from the brake driving wheel (77) to the push rod lower gear (70);

sixth clutch transmission device (91), arranged between the brake driving wheel (77) and the pneumatic push rod lower gear (90), used to control the switch between the connected or disconnected states to transmit the torque from the brake driving wheel (77) to the pneumatic push rod lower gear (90);

seventh clutch transmission device (63a), arranged between the spring tightening mechanism (63) and the first chain wheel (60), used to control the switch between the connected or disconnected states to transmit the torque from the spring tightening mechanism (63) to the first chain wheel (60);

eighth clutch transmission device (73a), arranged between the transmission shaft (53) and the brake shaft (75), used to control the switch between the connected or disconnected states to transmit the torque from the transmission shaft (53) to the brake shaft (75);

wherein, the connected or disconnected mechanical transmission mechanisms of the first clutch transmission device

(43) and the connected or disconnected mechanical transmission mechanisms of the second clutch transmission device (44) are identical in structure, but opposite in torque transmission direction; one end of them is the inner ring assembly where each acting gears (45) and each reset gears (46) are identical in radius, tooth shape and tooth number, while another end is the cylinder-combined engine where each piston rod upper gears (33) and each piston rod lower gears (34) are identical in radius, tooth shape and tooth number, in addition, the piston rods (13) of the first cylinder (9) and the second cylinder (10) are identical in length, moreover the racks on the two opposite sides of the piston rods (13) of the first cylinder (9) and the second cylinder (10) are identical in length, tooth shape and tooth number, and such structures are advantageous for the controller to respectively control the first clutch transmission devices (43) and the second clutch transmission devices (44) to be switched periodically and orderly between the connected and disconnected states, to make each of the first cylinder (9) and the second cylinder (10) repeat transformation between the power stroke (26) and the return stroke (27), and in each cylinder-combined engine the power stroke (26) of the first cylinder (9) is synchronous with the return stroke (27) of the second cylinder (10), and then the return stroke (27) of the first cylinder (9) is synchronous with the power stroke (26) of the second cylinder (10), alternatively.

In this Embodiment, a System Economically Using Compressed Air as an Automobile Power Source has the following Advantages 1) Economical and Environmental Production and Supply of Compressed Air Any kind of new energy for automobile vehicles faces a primary issue, namely the cost problem with production and supply of this new energy. The use of compressed air as an automobile power source faces a problem with that "90% of electrical energy is converted into heat during the production of compressed air by air compressor".

On the other hand, the social demand for heating is very extensive, especially the shortage of heat source for central heating, while coal and fuel oil face the problems with greenhouse gas emission and environmental pollution.

In this invention, during the boiler-type HCAPS device (4) produces and supplies compressed air the heat converted from the 90% of electricity consumed by the air compressor can be used for central heating and/or home heating, both economical and environmental. Moreover, the extensive use of off-peak electricity during night, or wind power and solar energy power which is not easy to store, is more "cost-effective". In addition, the bent tube-type high-pressure compressed air storage (95) in the above device to store higher pressure compressed air, is not only beneficial to the collection of heat in cooling water (109), and but also to the safer production and storage of higher pressure compressed air because common sense and stress analysis and strength design based on mechanics reveal that a cylinder wall in smaller diameter has a better capacity to bear pressure than that in larger diameter when other conditions are the same.

2) More Energy Saving and Storing in the Automobile-Mounted Air Storage Tubes (1)

Physical experiments have shown that a gas is rapidly compressed with increasing its temperature, while quickly expanding with decreasing its temperature. During the process of an air compressor pressurizing and inflating air into an air storage Tank on an existing technology compressed air vehicle, the air amount compressed from the air compressor cylinder working chamber into the Tank each time is very small in comparison to that of the air capacity of the Tank (the volume of the air compressor cylinder working chamber is far smaller than that of the Tank), when such small air amount compressed into the Tank each time(the air just under a slightly higher pressure than that in the Tank can be compressed into the Tank), such little volume air pressure-drop in the Tank does not obviously cause the large volume air in the Tank occurring pressure-drop only leading to a very small trend of pressure-drop and temperature-drop in the Tank. However, the large volume air in the Tank is constantly compressed (by the air compressor) accompanying its pressure-rise and temperature-rise so that in the Tank the trend of temperature-rise is significantly greater than the trend of temperature-drop. Therefore, the air temperature in the air storage Tank is always increased during the process of an air compressor pressurizing and inflating air into the Tank on an existing technology compressed air vehicle. And as a part of heat energy is to be consumed onboard, the vehicle needs a facility to cool the automobile air storage Tank. Moreover, as the temperature is hardly cooled sufficiently at the moment of ending the inflation process, and hereafter the air temperature in the automobile air storage Tank should continue to drop, and so does its pressure, leading to an automatic reduction of the air pressure potential energy stored in the Tank after ending the inflation process.

In this invention, however, the capacity of bent tube-type high-pressure compressed air storage (95) in all kind of boiler-type HCAPS devices (4) is significantly larger than that of a set of automobile-mounted air storage tubes (1), and the pressure in the storage (95) is always significantly higher than the set pressure in the tubes (1). The discharge amount from the storage (95) into the tubes (1) and its pressure-drop in the tubes (1) result in a significant trend of temperature-drop of the air in the tubes (1), on the other hand the pressure-rise of the original air in the tubes (1) may result in a trend of temperature-rise. Controlling the discharge amount and its flow velocity can have the trend of temperature-drop buffer with each other the trend of temperature-rise in the tubes (1), to make the air temperature in the tubes (1) basically stabilized during the pressurization and inflation process without wasting a part heat onboard, thus avoiding to equip onboard a cooling facility corresponding to the air storage device, and also avoiding to have an automatic reduction of the energy storage resulted from the pressure-drop with the temperature-drop of high-temperature air in the tubes (1) after ending the inflation process.

The existing technology compressed air vehicle carries a compressed air Tank of 300 liters or so, in which filled is the compressed air under a pressure of 30 MPa, approximately equivalent to 51 MJ energy (feasible to drive a distance about 300 km, with a top speed of 105 km/h). In this invention, the inner diameter of automobile-mounted air storage tubes (1) is designed to be smaller than that of the Tank above-mentioned. For the same material conditions, the tubes in smaller inner diameter can bear higher pressure, and so the compressed air pressure in the present automobile-mounted air storage tubes (1) can be ≥30 MPa. Moreover, the total capacity of high-pressure compressed air onboard can be increased by increasing the length of each line of the tube (1) (winding or stretching on itself) and the quantity of the tubes (1) (to be the sum of inner volumes of them), thus advantageous to have a sufficient capacity of high-pressure compressed air, further improving the driving distance and speed.

In this invention, the considerations to implement a compressed air pressure ≥30 MPa in the automobile-mounted air storage tubes (1) involves: a) references to the gas pressure in other types of those state-of-art vessels to bear inner pressure: Mercedes-Benz B-class fuel cell vehicles equipped with three hydrogen storage tanks under a pressure of 70 MPa (about 4 kg of gaseous fuel stored in each tank); not long ago, another kind of off-board TOBUL piston energy accumulator has reached an inner pressure up to 138 MPa after more than 40 years of development; b) as materials science progresses, the materials tensile strength has constantly been enhanced—it is reported that the tensile strength of a new high-strength carbon fiber composite materials is as high as 8.27 GPa; according to mechanics, a cylinder wall (especially the thin wall of cylinder in compressed air storage device and the like) mainly bear tension or stress, and so the constant appearance of new materials will benefit to the pressure enhancement in pneumatic transmission energy accumulator; c) the design of automobile-mounted air storage tubes (1) in this invention has taken a smaller diameter in comparison with the state-of-art automobile gas storage Tank, as stress analysis and strength design based on mechanics reveal that the cylinder wall in smaller diameter has a better capacity to bear pressure than that in larger diameter when other conditions are the same.

3) Safety

Like dealing with most of the technical problems, the application of compressed air has already included safety considerations, mainly concerning the possible rupture of automobile gas storage devices. A conventional measure to prevent the rupture from occurring is the establishment of the Safety codes, in which the legal working pressure qualified by safety norms shall be less than 40% of the rupture pressure of a gas storage device, meaning a safety factor of 2.5 (i.e., the ratio of ultimate stress to allowable stress is 2.5), to ensure any of automobile gas storage devices generally not to break in case of vehicle collision. Considering the pressure of the already mentioned TOBUL piston accumulator to be up to 138 MPa, while the United States TOBUL accumulator safety coefficient is the highest in the field, the safety coefficient is 4. And the safety performance evaluation on Mercedes-Benz B-class fuel cell vehicles equipped with three hydrogen storage tanks under a pressure of 70 MPa have concluded: "most components of this fuel cell driving system are located in the lower part beneath the cockpit floor, including hydrogen storage, fuel cell reactor, lithium ion batteries, power distribution unit, etc. . . . in a certain extent, reducing the body gravity center to make the protection of driving system very effective and also relatively safe even in collision."

It is not difficult to understand that, in this invention, the compressed air pressure within a certain range of ≥30 MPa in the automobile-mounted air storage tubes (1) can have a safety factor >2.5 up to 3-4, thus technically feasible, and also conforming to the corresponding safety norms. Actually, the college textbook has articulated the common characteristics of the pneumatic transmission with compressed air as its working medium: the pneumatic transmission has a quick action, fast response, strong adaptability to working environments, especially safe and reliable working under the bad conditions, such as large temperature difference, flammable, explosive, dusty, vibrating and so on. According to industry statistics, in the 1970 s, the ratio of output values of hydraulic transmission components to pneumatic transmission components is about 9:1, but today has reached 6:4 in developed countries, even close to 5:5. The rapid developments and increasingly wide applications of compressed air technology are just because of the advantages of pneumatic transmission in fireproof, explosion-proof, energy-saving, high-efficiency, no pollution, etc. By contrast, just in case of an traffic accident involving the damage and danger of high impact collision, the compressed air itself is not flammable, while other automobile fuels such as gasoline, hydrogen gas and natural gas are flammable and explosive. Moreover, a compressed air storage device itself is made of carbon fiber, which under a too large pressure can be brittle, not to result in any shrapnel but only a situation with its "broken" shell leaking the compressed air, but relatively good in safety.

4) Reliable Seal

For the application of compressed air, people usually have a concern with the possible leakage of an automobile compressed air storage device. With the progress in pneumatic transmission technology, the valve seal technology is also more reliable, even as one of the advantages of the compressed air vehicles evaluated in the field. Compared with electric vehicles which will automatically have its battery power slowly run out with time extend even in the case of using no electricity, but the leakage rate of an automobile compressed air storage device is so low that the idle time of a compressed air vehicle can be longer than that an electric vehicle.

5) Automobile Lightweighting

It is known that the automobile lightweighting is one of the development trends to reduce the energy consumption and emissions of vehicle driving. UK-China advanced Materials Symposium made a foresight for a wide application of magnesium alloys to make cars lightweighting by half. In 2012, India's TATA showed a vehicle AirPod, which body is made of glass fiber and which gross weight is 220 kg, accommodating three adults. AirPod is powered in combination by compressed air and a battery electric motor, and can be additionally equipped with an electric hybrid braking energy recovery system to charge its battery.

In this invention, an automobile-mounted device (3) uses compressed air as the driving force and performs the recovery and regeneration of braking energy in the potential energy form of the spring elasticity and gas pressure. Its structure is so simple and light as to avoid to use the traditional automobile combustion engine, electric motor-generator and battery, not necessary to set up a related radiating system, spark plugs, starter motor, and muffler and so on, so that the vehicle can be further lightweighting based on its body made of new materials with high strength and light weight, thus reducing the driving power and running energy consumption, and having a simplified structure and lower production cost.

6) Adequate use of Automobile Compressed Air Energy

In the traditional technologies, an engine piston drives the crankshaft to rotate (e.g., internal combustion engine), and does work in one of four strokes completed while meeting a large resistance in other three strokes of intaking, compressing and exhausting gas (not doing any effective work). In this invention, the piston in the compressed air power device has a power stroke (26) in either of two strokes completed while another is a return stroke (27) with a small resistance, thus having a higher efficiency in comparison with the traditional technologies. Moreover, each cylinder-combined engine has a first cylinder (9) and a second cylinder (10) in such an organic configuration that a cylinder piston performs a power stroke (26) (piston (12)—piston rod (13)—piston rod upper gear (33)—inner gear ring (2) powering) while another cylinder piston does a return stroke (27) (inner gear ring (2)—piston rod lower gear (34)—piston rod (13)—piston (12) returning), maintaining the inner gear ring assembly to output torque to the flywheel. As the inner diameter of the first cylinder (9) is less than that of the second cylinder (10), it is conducive to the reset of first cylinder piston during the power stroke of second cylinder piston. Meanwhile, the radiuses of first and second cylinder cavities basically conform to the relationship as aforementioned:

$$r_2 = r_1\sqrt{(mn-1)/u}$$

where $r_1$ stands for radius of the first cylinder cavity, $r_2$ for radius of second cylinder cavity, n for pressure (bar) of compressed air injected from the air storage tubes into the first cylinder closed end space, m for increasing ratio of absolute temperature of compressed air injected into the first cylinder closed end space after heated by electric heater (namely air expansion ratio), u for ratio of length of cylinder cavity to that of its closed end space.

In this way, when each cylinder-combined engine completes a working cycle, the pressure of the air exhausted from second cylinder (10) is close to atmosphere (about 1 bar), that is, in the beginning of the working cycle, the air pressure potential energy carried by compressed air injected into the first cylinder closed end space (16) can be adequately used in each working cycle of the cylinder-combined engine.

7) Analysis Based on a Set of Parameters Generated Randomly:

Just as an example, a preliminary approximate analysis is made for the thrust forces and their works produced by the first and second cylinder pistons in the cylinder-combined engine: let the radius of first cylinder cavity $r_1=5$ cm, the pressure of compressed air injected from the air storage tubes (1) into the first cylinder closed end space (16) n=30 bar=300 N/cm$^2$, increasing ratio of absolute temperature of compressed air injected into the first cylinder closed end space (16) after heated by electric heater (22) m=1 (i.e. assuming absolute temperature not to change m=1), ratio of length of cylinder cavity to that of its closed end space u=10, according to the designation mentioned above $r_2=r_1\sqrt{(mn-1)/u}$, the radius of second cylinder cavity $r_2=8.5$ cm, the cylinder length L=50 cm (the length of first and second cylinder is equal), the atmospheric pressure P=1 bar=10 N/cm$^2$.

I, For the first cylinder:

a) compressed air force pressing on the inner side of the first cylinder piston at the moment before performing its power stroke $$F_{1,in} = mn\pi r_1^2 = 23550 \text{ N}$$

b) atmospheric force pressing on the outside of the first cylinder piston $$F_{1,out} = P\pi r_1^2 = 785 \text{ N}$$

c) initial thrust force pushing the first cylinder piston to performing power stroke $$F_1 = 23550 - 785 = 22765 \text{ N}$$

d) work done by power stroke of first cylinder piston $$W_1 = \int_a^b \left(mn\pi r_1^2 \frac{L}{ux} - P\pi r_1^2\right)dx = 2354 \text{ J}$$

where $b = \frac{u-1}{u} \cdot L, a = 0$

II, For the second cylinder:

a) compressed air pressure in the second cylinder closed end space interlinked to the first cylinder cavity at the moment before performing power stroke in the second cylinder $$P_2 = mn\frac{\pi r_1^2 \cdot L/u}{\pi r_1^2 \cdot L + \pi r_2^2 \cdot L/u} = 3.8 \text{ bar} = 38 \text{ N/cm}^2;$$

b) compressed air force pressing on the inner sider of the second cylinder piston at the moment before performing its power stroke $$F_{2,in} = P_2 \pi r_2^2 = 8620 \text{ N}$$

c) atmospheric force pressing on the outside of second cylinder piston $$F_{2,out} = P\pi r_1^2 = 2268 \text{ N}$$

d) initial thrust force pushing the second cylinder piston to performing power stroke $$F_2 = 8620 - 2268 = 6352 \text{ N}$$

e) work done by power stroke of the second cylinder piston $$W_2 = \int_a^b \left(P_2\pi r_2^2 \frac{\pi r_1^2 L + \pi r_2^2 L/u}{\pi r_1^2(L-x) + \pi r_2^2\left(\frac{L}{u}+x\right)} - P\pi r_2^2\right)dx = 1450 \text{ J}$$

where $b = \frac{u-1}{u} \cdot L, a = 0$ f) Pressure in the second cylinder cavity interlinked to the first cylinder closed end space at the moment when ending power stroke in the second cylinder $$P_{end} = mn\frac{\pi r_1^2 L/u}{\pi r_1^2 L/u + \pi r_2^2 L} = 1.0 \text{ bar} = P \text{ (atmosphere)};$$

In the above example, the pressure of compressed air injected into the first cylinder closed end space (16) is 30 bar, and falls to 1.0 bar (atmospheric pressure) as the air pressure in the second cylinder cavity when the cylinder-combined engine has worked in a cycle, indicating that the engine can efficiently makes use of the pressure potential energy of compressed air injected from the air storage tubes (1) into the first cylinder closed end space (16) according to $$r_2 = r_1\sqrt{(mn-1)/u}.$$

In the above example, the estimations on the thrust force and power effect of the first and the second cylinder piston in the cylinder-combined engine have still a great appreciation space to increase, because of the following considerations.

(a) The above geometric parameters, $r_1$, $r_2$, u, and L, are not optimized. In fact, the optimization on another variety of geometrical parameters in collocation can be made according to the needs of design, to have a result superior to the above. For instance, the larger load vehicles match the cylinders in smaller diameter and longer stroke to focus on the role of torque, while the fast vehicles suit the cylinders in larger diameter and short stroke to focus on the output of speed.

(b) In the above example, n=30 bar (3 MPa), referred to that the pressure in a compressed air tank loaded on the existing technology compressed air vehicles is 30 MPa (300 bar), while the pressure of compressed air injected from the tank into the compressed air engine is 3 MPa. As mentioned above in this invention, however, the pressure in the automobile-mounted air storage tubes (1) can be much higher than 30 MPa, and so the pressure of compressed air injected from the air storage tubes (1) into the first cylinder closed end space (16) can be also higher than 3 MPa, thus having an appreciation space to increase, and so does the total capacity of compressed air stored in one or more such air storage tubes (1), referred to the above, "More energy saving and storage in automobile storage tubes (1)".

(c) In the above example, m=1, which is to assume no change in the absolute temperature of compressed air in the first cylinder closed end space (16) after heated by electric heater. It has been well-known, however, that the electric heater has characteristics of small volume, large power, fast heating response, high precision of temperature control, high heating temperature, long service life, high reliability, fully automatic control, high thermal conversion rate and so on, and so can heat rapidly to increase the temperature of compressed air that is to enter and have entered the first cylinder closed end space (16), up to 3-5 times, as suggested by some references. In fact, if heated to temperature 315° C., m=2; to about 600° C., m=3; to about 900° C., m=4, even possible up to m=5, thus to gain greater thrust and more work power. Different from other automobile fuels such as gasoline, hydrogen gas and natural gas, which must be heated in the engine to a critical point of extremely high temperature (ignition point) to do work with explosion, the compressed air used as automobile "fuel" has no critical temperature point (ignition point) but even with slightly heating to increase the work power, which is one of the characteristics and advantages of using compressed air as automobile power.

Not only the thrust force and power effect of a cylinder-combined engine has still an great appreciation space to increase, but also the compressed air power device in this invention can be equipped with a number of cylinder-combined engines to increase the driving distance and speed.

8) Less Loss in Torque Output

In physics, torque is a special moment M, $M=F\ r\ \sin\alpha$, where F stands for the force to make an object rotating, r for the line segment between the rotation axis and the action point of the force making the object rotating, $<\alpha$ for the angle between r and F; and if F is a component force of a motive force f and if $<\beta$ is the angle between f and F, then $F=f\cos\beta$. It is obvious that the torque M depends on f, r, $<\alpha$ and $<\beta$, where f and r are usually designed as constants, so $<\alpha$ and $<\beta$ are maybe associated with the loss in torque output. For the traditional engine torque output mode can be simplified as piston reciprocating motion via crank connecting rod and crankshaft connecting rod transformed into crankshaft rotation. For the cylinder-combined engine torque output mode can be simplified as piston reciprocating motion via piston rod transformed into piston rod upper gear rotation. In order to compare the losses of torque output between the torque output mode of the cylinder-combined engine in this invention and the torque output mode of the traditional engine, let (a) $f_1$ stand for the piston thrust force in the present cylinder-combined engine and $f_2$ for the piston thrust force in a traditional engine where $f_1=f_2=f$ (f is equivalent to the motive force above);

(b) $F_1$ stand for the force to make the upper gear rotating in the present cylinder-combined engine and $F_2$ for the force to make the crankshaft rotating in a traditional engine ($F_1$ and $F_2$ are equivalent to F, the force to make the object rotating as mentioned above);

(c) $r_1$ stand for the line segment between the axis of the piston rod upper gear and the action point of the force $F_1$ making the piston rod upper gear rotating, and $r_2$ stand for the line segment between the axis of crankshaft and the action point (or the far end of crankshaft connecting rod) of the force $F_2$ making the crankshaft rotating, where $r_1=r_2=r$ (r is equivalent to the line segment between the rotation axis and the action point of the force making object rotating as mentioned above, $r_1$ to the radius of upper gear and $r_2$ to the length of the crankshaft connecting rod);

(d) $M_1$ stand for the torque output from the mode "Piston—Piston Rod—Piston Rod Upper Gear" in the present cylinder-combined engine and $M_2$ for the torque output from the mode "Piston—Crank Connecting Rod—Crankshaft Connecting Rod—Crankshaft" in the traditional engine, then:

I, In the present cylinder-combined engine, a) for "$<\beta$ is the angle between f and F, then $F=f\cos\beta$"

∵ piston thrust force $f_1$ is in the same direction as the force $F_1$ to make the piston rod upper gear rotating (the direction of the force $F_1$ is the direction of the piston rod movement), ∴angle between $f_1$ and $F_1$, $<\beta_1=0°$, ∴ $\cos\beta_1=\cos 0°=1$, ∴$F_1=f_1\cos\beta_1=f_1=f$;

b) for "$<\alpha$ for the angle between r and F, then $M=F\ r\ \sin\alpha$"

∵$F_1\perp r_1$ (the direction of $F_1$ is the direction of the piston rod movement, $F_1$ is always vertical to $r_1$, $r_1$ is the radius of the piston rod upper gear, and $r_1$ is the line segment between the axis of the piston rod upper gear and the action point of the force $F_1$ making the piston rod upper gear rotating), ∴angle between $F_1$ and $r_1$, $<\alpha_1=90°$, ∴ $\sin\alpha_1=\sin 90°=1$, ∴$M_1=F_1 r_1 \sin\alpha_1=f_1 r_1 \sin\alpha_1=f_1 r_1=f\ r$;

II, In the traditional engine (crank and crankshaft), a) for "$<\beta$ is the angle between f and F, then $F=f\cos\beta$"

∵ during most of the time, piston thrust force $f_2$ is not in the same direction as the force $F_2$ to make crankshaft rotating (the direction of the force $F_2$ is the direction of the crank connecting rod movement), ∴angle between $f_2$ and $F_2$, $<\beta_2\neq 0°$ during most of the time, ∴ $\cos\beta_2\neq\cos 0°$ during most of the time, ∴ $\cos\beta_2\leq 1$ ($\cos\beta_2<1$ during most of the time), ∴$F_2=f_2\cos\beta_2=f\cos\beta_2\leq f$ ($f_2\cos\beta_2<f$ during most of the time);

b) for "$<\alpha$ for the angle between r and F, then $M=F\ r\ \sin\alpha$"

∵$F_2$ is not vertical to $r_2$ during most of the time, (the direction of $F_2$, is the direction of the crank connecting rod movement, $r_2$ is the line segment between the axis of crankshaft and the action point of $F_2$, i.e. the far end of the crankshaft connecting rod, namely $r_2$ is equivalent to the crankshaft connecting rod, $F_2$ is not perpendicular to $r_2$ during most of the time), ∴angle between $f_2$ and $F_2$, $<\alpha_2\neq 90°$ during most of the time, ∴ $\sin\alpha_2\leq 1$ ($\sin\alpha_2<1$ during most of the time), ∴$M_2=F_2 r_2 \sin\alpha_2=f_2\cos\beta_2\ r_2\sin\alpha_2=f\ r\cos\beta_2\sin\alpha_2\lll f\ r$ III, Comparison between a present cylinder-combined engine and a traditional engine a) ∵ $M_1=f_1\cos\beta_1 r_1\sin\alpha_1=f_1 r_1=f\ r$ b) ∵ $M_2=f_2\cos\beta_2 r_2\sin\alpha_2=f_2 r_2\cos\beta_2\sin\alpha_2\lll f\ r$ c) ∴ $M_1=f\ r\ggg f\ r\cos\beta_2\sin\alpha_2=M_2$ d) ∴ $M_1\ggg M_2$ Therefore, the cylinder-combined engine in this invention have a smaller losses in torque output than that of the traditional engine. By the same reason, torque output of the spring reserving-leasing device and compressed air reserving-leasing device in this invention via push rod, push rod upper gear and pneumatic push rod, pneumatic push rod upper gear, is also relatively smaller.

9) Spring Elastic Force Hybrid

It is well known that spring accumulator is a classic accumulator, small as being used in a precise watch, big in the reservation and release of a force in tons. In this invention, a spring reserving/releasing device can usually use a pneumatic torque wrench, powered by compressed air (maximum torque up to 300000 N.m produced by pneumatic torque wrench) to recharge its power. On the other hand, in the case of extreme difficulty and special situation (even in the war) the device can make use of a torque multiplier equipped or carried onboard with a manual-twist spring power mechanism to complete the spring compression and tensile, thus getting the vehicle some power to run from the predicament.

Of course, the spring reserving/releasing device in this invention is mainly used for automobile braking energy recovery and regeneration.

10) Qualified for Brake Energy Recovery and Regeneration

The energy required for reserving-releasing in a vehicle is the kinetic energy $W_d$ lost during its deceleration and braking, relevant to the vehicle curb mass (m) and its speed change ($v_2-v_1$), $W_a$ is the energy required for the speed accelerating from $v_1$ to $v_2$.

$$W_d = \tfrac{1}{2}mv_2^2 - \tfrac{1}{2}mv_1^2 = -W_a$$

In the case of Elantra of China Chang'an Automobile Group, its vehicle kerb mass is 985~1120 kg, with an additional load, up to 1200 kg (m=1200 kg); when its speed is decreased from 30 km/h to zero during its deceleration/braking, or increased from zero to 30 km/h during its starting/acceleration, the change in its kinetic energy, or the energy for reserving/releasing, is about 41666 J (the same for its deceleration from 50 km/h to 40 km/h, or for acceleration from 40 km/h to 50 km/h). If only making an approximate calculation on W the energy for reserving-releasing contributed by compressed air in a spring cylinder (83) of the present compressed air reserving-releasing device (temporarily excluding the additional contribution of helical spring (82) in spring cylinder (83), and excluding the contribution of the spring reserving-releasing device), $$W = \int_x^l sp\frac{l}{x}dx$$

Where l stands for the initial length of compressed air in a cylindrical spring cylinder cavity, p for the initial pressure of compressed air in the cavity, x for the length of compressed air after further compressed in the cavity, and s for the area of a pneumatic piston.

For one of the alternatives for the present compressed air reserving-releasing device qualified for reserving/releasing energy 41666 J, the cylinder length l=50 cm (coupled with 50 cm for motion chamber, the total length is about 1 m), radius of spring cylinder cavity is 5 cm (p=10 MPa, for an initial pressure in spring cylinder cavity), or radius of spring cylinder cavity is 7 cm (p=5 MPa).

The above parameters are only used as a reference for optimization on the size and number of the cylinders for a variety of automobile models and speed changes. It can be added that, if considering the trend of automobile light-weighting and the above structure of the present compressed air hybrid vehicle further lighted by getting rid of internal combustion engine, electric motor and battery, such a "cylinder with 5 cm in radius and a half meter in length" can be qualified for a larger range of speed changes.

In this invention, the braking energy recovery and regeneration system includes one or more spring reserving-releasing devices and one or more compressed air reserving-releasing devices, which parameter-design can be adapted to the energy required for reserving/releasing in the vehicle. In this invention, the braking energy recovery and regeneration system can effectively recover the kinetic energy lost during deceleration and braking of a compressed air driving vehicle and recycle for its starting and acceleration, to save the consumption of compressed air in the air storage tubes as the automobile driving power. This is especially important for driving in the urban areas with more traffic congestions and more traffic lights, as it is known that in those areas, the energy consumption on the repeated braking-starting and deceleration-acceleration often accounts for 40-60% of its total energy consumption.

In the embodiment the said method particularly comprises the following steps:

Step 1: at the main-station, aforementioned producing and supplying compressed air station, the boiler-type HCAPS device (4) is pressurized and inflated by the air compressor (98) utilizing off-peak electricity during night or wind power and solar energy power which is not easy to store, and the control system regulates the emission from the air compressor (98) to the bent tube-type high-pressure compressed air storage (95) adapted to the flow of cooling water (109) entering the water tank (94), so that a large amount of air is compressed in the bent tube-type high-pressure compressed air storage (95), and pressurized to the predefined high pressure and stored for later use, meanwhile, the cooling water (109) is heated to the predefined higher temperature and converged to the central heating system;

Step 2: control system timely regulating the flow rate and velocity of high-pressure compressed air from the bent tube-type high-pressure compressed air storage (95) in the boiler-type HCAPS device (4) into the automobile-mounted air storage tubes (1) so that the compressed air in the air storage tubes (1) reaches the set pressure without a major change in temperature during the air inflation process;

Step 3: when the automobile starts or accelerates, the spring reserving-releasing device and/or compressed air reserving-releasing device and its energy release drive transmission mechanism starts, the cylinder-combined engines powered by compressed air and their transmission mechanism work simultaneously to drive the automobile beginning to run;

Step 4: during the automobile runs, each cylinder-combined engine completes the following steps under the control of the controller:

S11, at the moment before the power stroke (26) in the first cylinder (9), the piston (12) in the first cylinder (9) abuts beside the blocking member (25) outside the first cylinder closed end space (16), the air storage tube inlet/exhaust valve (6) and the first cylinder inlet valve (17) are opened while the first cylinder exhaust valve (18) is in the closed state, and the high-pressure compressed air injected from the air storage tubes (1) to the first cylinder closed end space (16) is heated by the electric heater (22) around the exhaust duct (7) of the air storage tube (1) and the electric heater (22) around the first cylinder closed end space (16) to increase the air pressure greatly; meanwhile, both of the second cylinder inlet valve (19) and the second cylinder exhaust valve (20) are in a closed state, and the stopping terminal (29) of the piston rod (13) in the second cylinder (10) abuts against the buffering shock-absorbing device (30);

S12, the air storage tube inlet/exhaust valve (6) and the first cylinder inlet valve (17) immediately closed while the first cylinder exhaust valve (18) remains closed, the high-pressure compressed air that has been injected into the first cylinder closed end space (16) pushes the piston (12) and the piston rod (13) of the first cylinder (9) to move towards the outside of the piston (12) where it is the atmosphere pressure, the pressure difference between inside and outside the piston (12) is great, strongly promoting the power stroke (26) in the first cylinder (9), the piston rod (13) of the first cylinder (9) translationally moves outward driving the first cylinder piston rod upper gear (33a) acting rotation (38) and transmitting the torque via the first clutch transmission device A (43a) which is in the connected state to the first acting gear (45a) to rotate and drive the rotation of the inner gear ring (2), and meanwhile the second clutch transmission device A (44a) is in the disconnected state so that the first cylinder piston rod lower gear (34a) is in lower gear idling (39);

at this moment, the second reset gear (46b) rotating along with the inner gear ring (2) drives, through the second clutch transmission device B (44b) which is in the connected state at this time, the second cylinder piston rod lower gear (34b) to reset rotation (40), promoting the return stroke (27) of the piston rod (13) in the second cylinder (10), since at the moment the second cylinder inlet valve (19) is closed while the second cylinder exhaust valve (20) is opened and communicated directly with the atmosphere (21), the resistance to the return stroke (27) in the second cylinder (10) is very small, and the first clutch transmission device B (43b) is in the disconnected state, so that the second cylinder piston rod upper gear (33b) is in upper gear idling (41);

in this process, the torque produced by the rotation of the first acting gear (45a) and transmitted to the inner gear ring (2) is significantly greater than that consumed from the rotation of the inner gear ring (2) for driving the second reset gear (46b) to rotate, so that the torque obtained by the inner gear ring (2) can be output in a high ratio via the flywheel front inner meshing gear (48) to the flywheel (47);

S13, in the first cylinder (9) at the moment just before the power stroke (26) ends and the return stroke (27) is about to begin, the stopping terminal (29) of the piston rod (13) abuts against the buffering shock-absorbing device (30); at the same time, in the second cylinder (10) at the moment just before the return stroke (27) ends and the power stroke (26) is about to begin, the piston (12) abuts beside the blocking member (25) outside the second cylinder closed end space (24); at this time, the first clutch transmission device A (43a), the first clutch transmission device B (43b), the second clutch transmission device A (44a) and the second clutch transmission device B (44b) are all in the disconnected states, the first cylinder inlet valve (17) remains closed, the second cylinder exhaust valve (20) is immediately closed, and the first cylinder exhaust valve (18) and the second cylinder inlet valve (19) are then opened and communicated with each other directly, so that the compressed air which retains a certain pressure in the first cylinder (9) is quickly spread through the opened first cylinder exhaust valve (18) and second cylinder inlet valve (19) into the second cylinder closed end space (24);

S14, then both the second clutch transmission device A (44a) and the first clutch transmission device B (43b) are in the connected states;

at this moment the first cylinder inlet valve (17) remains closed, and the first cylinder exhaust valve (18) and the second cylinder inlet valve (19) are continuously opened and communicated with each other, the first reset gear (46a) rotating along with the inner gear ring (2) drives, through the second clutch transmission device A (44a) which is in connected state at this time, the first cylinder piston rod lower gear (34a) to reset rotation (40), promoting the return stroke (27) of the piston rod (13) in the first cylinder (9), while the first clutch transmission device A (43a) is in the disconnected state, so that the first cylinder piston rod upper gear (33a) is in upper gear idling (41);

at the same time, the second cylinder exhaust valve (20) remains closed, wile the second cylinder inlet valve (19) and the first cylinder exhaust valve (18) are continuously opened and communicated with each other, the pressure of the compressed air in the second cylinder closed end space (24) is higher than that of atmosphere pressure outside the piston (12) of the second cylinder (10), promoting the piston (12) and the piston rod (13) in the second cylinder (10) to translationally move outwards, starting the power stroke (26) in the second cylinder (10), and the piston rod (13) of the second cylinder (10) translationally moving outward drives the second cylinder piston rod upper gear (33b) acting rotation (38) transmitting the torque via the first clutch transmission device B (43b) which is in the connected state to the second acting gear (45b) to rotate and drive the rotation of the inner gear ring (2), meanwhile the second clutch transmission device B (44b) is in the disconnected state so that the second cylinder piston rod lower gear (34b) is in lower gear idling (39);

at this time the second cylinder closed end space (24) is communicated with the cylinder cavity (11) of the first cylinder (9), and because the radius $r_2$ of the cylinder cavity (11) of the second cylinder (10) is greater than the radius $r_1$ of the cylinder cavity (11) of the first cylinder (9), $r_2 > r_1$, and $r_2$ is $\sqrt{(mn-1)/u}$ times of $r_1$, the area of the piston (12) of the second cylinder (10) is significantly greater than that of the first cylinder (9), the pushing force of the power stroke (26) in the second cylinder (10) is significantly greater than the resistance of the return stroke (27) in the first cylinder (9); in the process, the torque transmitted from the rotation of the second acting gear (45b) to the inner gear ring (2) made by the power stroke (26) in the second cylinder (10) is significantly greater than that consumed from the rotation of the inner gear ring (2) for the rotation of the first reset gear (46a) to drive the return stroke (27) in the first cylinder (9), so that the inner gear ring (2) can have a certain torque to output via the flywheel front inner meshing gear (48) to the flywheel (47); moreover, when the return stroke (27) in the first cylinder (9) and the power stroke (26) in the second cylinder (10) end simultaneously, the air pressure both in the first cylinder closed end space (16) and in the cylinder cavity (11) of the second cylinder (10) drops to that close to the atmosphere pressure, then the piston (12) of the first cylinder (9) abuts beside the blocking member (25) outside the first cylinder closed end space (16) while the stopping terminal (29) of the piston rod (13) of the second cylinder (10) abuts against the buffering shock-absorbing device (30);

S15, it repeats step S11;

Step 5: when the automobile decelerates and/or brakes, the spring reserving-releasing device and/or compressed air reserving-releasing device and the braking energy storage transmission mechanism thereof work, to convert the kinetic energy reduced during the automobile decelerates and/or brakes into the potential energy for storage, and to convert the potential energy back into the automobile kinetic energy when the automobile starts and/or accelerates.

The invention claimed is:
1. A system comprising:
a compressed air power device;
a mechanism configured to produce, store and provide compressed air;
a brake energy recovery and regeneration device;
an inner gear ring assembly;
one or more clutch transmission devices; and
a controller,
wherein:
the compressed air power device includes one or more air storage tubes on an automobile and one or more cylinder-combined engines to produce driving power using the compressed air;
the mechanism to produce, store and provide the compressed air includes a boiler-type high-pressure compressed air production and storage (HCAPS) device and an air compressor,
wherein working pressure of the air compressor is approximately 100 MPa, and
wherein the boiler-type HCAPS device comprises:
a water tank connected to a central heating system; and
a bent tube-type high-pressure compressed air storage, wherein the bent tube-type high-pressure compressed air storage is arranged inside the water tank, and one end of the bent tube-type high-pressure compressed air storage is connected with the air compressor and another end of the bent tube-type high-pressure compressed air storage is connected with air inflation equipment to connect with the air storage tube,
the mechanism to produce, store and provide the compressed air uses electricity during a period of low energy demand to produce and store the compressed air pressurizing and inflating the air storage tubes, wherein the period of low energy demand includes off-peak electricity at night or when electric energy is not easily stored while recovering by-produced heat for central heating;
the brake energy recovery and regeneration device includes:
a spring reserving-releasing device;
a compressed air reserving-releasing device;
a braking energy storage transmission mechanism; and
an energy release drive transmission mechanism,
wherein the brake energy recovery and regeneration device is configured to reduce consumption of the compressed air in the air storage tubes used as the driving power for an automobile by recovering kinetic energy lost during a deceleration and braking of the automobile which is driven by compressed air as power source, and by utilizing recycled energy in starting and accelerating the automobile;
the inner gear ring assembly comprises:
an inner gear ring;
a first accelerating gear;
a second accelerating gear;
a flywheel front inner meshing gear;
a plurality of acting gears; and
a plurality of reset gears, wherein the first accelerating gear, the second accelerating gear, the flywheel front inner meshing gear, the plurality of acting gears, and the plurality of reset gears are arranged at respective fixed axes innerly meshing with the inner gear,
the plurality of acting gears is respectively in transmission connection with the one or more cylinder-combined engines via clutch transmission devices,
the first accelerating gear is in transmission connection with the spring reserving-releasing device via the clutch transmission device,
the second acceleration gear is in transmission connection with the compressed air reserving-releasing device via a clutch transmission device,
the flywheel front inner meshing gear is driven by rotation of the inner gear ring to rotate and is in transmission connection with a flywheel to output rotating torque of the inner gear ring to the flywheel, and
the plurality of reset gears are driven by the rotation of the inner gear ring to rotate and can return the torque back to the cylinder-combined engines via the clutch transmission devices respectively;
the clutch transmission devices are connected with the controller,
wherein the air storage tube is a long tube-type high-pressure compressed air storage device, an air storage tube wall of the air storage tube is made of a high-pressure resistant material,
one end of the air storage tube is sealed, while another end of the air storage tube is equipped with an air storage tube inlet/exhaust valve controlled by the controller,
the air storage tube inlet/exhaust valve is connected with the bent tube-type high-pressure compressed air storage via an air storage tube inflation valve to inflate the air storage tube with the compressed air,
the air storage tube inlet/exhaust valve is connected with an air storage tube exhaust duct via which
the air storage tube inlet/exhaust valve communicates with the cylinder-combined engines to exhaust compressed air to the cylinder-combined engines,
the air storage tube is coiled together or extended along an orientation of a car frame and chassis, a protective shell is arranged outside the air storage tube,
the air storage tube provides the one or more cylinder-combined engines with the compressed air, while one cylinder-combined engine is filled from another air storage tube,
each cylinder-combined engine includes a first cylinder and a second cylinder, wherein
each of the first cylinder and the second cylinder comprises a cylinder cavity, a piston, a piston rod and a long tube-type sliding barrel, wherein
one end of the cylinder cavity is an open end and another end is a closed end, a closed end space is arranged in each cylinder cavity near the closed end,
the closed end space of the first cylinder is a first cylinder closed end space,
the closed end space of the second cylinder is a second cylinder closed end space, the piston is arranged in a sliding mode between the open end and a blocking member outside the respective closed end spaces, one end of the sliding barrel is fixed to the open end while another end of the sliding barrel is provided with a buffering shock-absorbing device with a vent in communication with an atmosphere, one end of the piston rod connects to a surface of the piston facing the buffering shock-absorbing device, while another end of the piston rod outstretches from the open end of the cylinder cavity and connects to a stopping terminal, the piston rod is accommodated in the sliding barrel and moves translationally within the sliding barrel, each of two opposing sides of the piston rod is provided with a rack, respectively meshing with a piston rod upper gear and a piston rod lower gear, the piston rod upper gear of the first cylinder is a first cylinder piston rod upper gear, the piston rod upper gear of the second cylinder is a second cylinder piston rod upper gear, the piston rod lower gear of the first cylinder is a first cylinder piston rod lower gear, the piston rod lower gear of the second cylinder is a second cylinder piston rod lower gear, the piston rod upper gear is in transmission connection with acting gears via the clutch transmission device, the piston rod lower gear is in transmission connection with the reset gears via the clutch transmission device, lengths of the cylinder cavities of the first cylinder and the second cylinder are identical, lengths of the first cylinder closed end space and the second cylinder closed end space are identical, the first cylinder closed end space is equipped with a first cylinder inlet valve and a first cylinder exhaust valve controlled by the controller, the second cylinder closed end space is equipped with a second cylinder inlet valve and a second cylinder exhaust valve controlled by the controller, the first cylinder inlet valve is communicated with the air storage tube inlet/exhaust valve via the air storage tube exhaust duct, an electric heater and a heat preservation thermal insulation layer are arranged around the air storage tube exhaust duct and the first cylinder closed end space, the second cylinder inlet valve is in communication with the first cylinder exhaust valve, the second cylinder exhaust valve is in communication with the atmosphere, and an inner diameter of the cylinder cavity of the first cylinder is less than that of the cylinder cavity of the second cylinder, and the both satisfy the following relation:

$r1+\sqrt{((mn-1)/u)} \times r2$ wherein r1 is a radius of the cylinder cavity of the first cylinder, r2 is a radius of the cylinder cavity of the second cylinder, n is a pressure (bar) of compressed air inflated from the air storage tubes to the first cylinder closed end space, m is an air expansion ratio of absolute temperature of compressed air entering the first cylinder closed end space after being heated by the electric heater, and u is length of the cylinder cavity to respective closed end spaces.

2. The system according to claim 1, wherein:

the water tank comprises a water container comprising a water inlet and a water outlet, the water inlet interlinks to a to-be-heated water source, the water outlet communicates with an underground buried insulation pipe of the central heating system, the bent tube-type high-pressure compressed air storage being a bent coiled tub-type structure in the water tank, a tube wall of the bent tube-type high-pressure compressed air storage is made of high pressure resistant material, the bent tube-type high-pressure compressed air storage is configured to exchange heat with cooling water outside the tubes, and an inlet orifice of the bent tube-type high-pressure compressed air storage is configured to receive the high-pressure compressed air from the air compressor exhaust valve, while an outlet orifice of the bent tube-type high-pressure compressed air storage is connected with an air inflation machine used to pressurize and inflate the air storage tubes onboard.

3. The system according to claim 1, wherein the boiler-type HCAPS device comprises a large boiler-type HCAPS device, a medium boiler-type HCAPS device, and a small boiler-type HCAPS device according to a volume of the boiler-type HCAPS device, wherein:

the large boiler-type HCAPS device being arranged at a main-station producing compressed air as a heat source and supplying compressed air for the air storage tubes on the automobiles, the medium boiler-type HCAPS device being movably connected with ground facilities, the medium boiler-type HCAPS device is hoisted onto an auto trailer to transport between the main-station where the medium boiler-type HCAPS device is pressurized and inflated with air by the air compressor and a sub-station where the compressed air in the medium boiler-type HCAPS device inflates the air storage tubes on the automobiles, and the small boiler-type HCAPS device uses a home air compressor during a night when electricity is off peak to pressurize and inflate the bent tube-type high-pressure compressed air storage with air and in-home running water used as cooling water heated in the water tank and then converged to a household system of hot water and/or home heating pipelines, wherein the air pressure in the bent tube-type high-pressure compressed air storage of the small boiler-type HCAPS device is higher than a rated air pressure in the air storage tubes mounted on an automobile and the volume of the bent tube-type high-pressure compressed air storage of the small boiler-type HCAPS device is greater than that of one of automobile-mounted air storage tubes.

4. The system according to claim 1, wherein the spring reserving-releasing device includes a push rod, a cylindrical spiral compression spring, a cylindrical spiral tensile spring, a first chain wheel, a second chain wheel, a chain, and a spring tightening mechanism, wherein:

the compression spring and the tensile spring are fixedly connected to two ends of the push rod, respectively, the push rod is accommodated into a long barrel type push rod chamber to move translationally, a guide sleeve is additionally arranged outside the cylindrical spiral compression spring and a sleeve is additionally arranged outside the cylindrical spiral tensile spring, while the guide sleeve and the sleeve are respectively fixedly connected to two ends of the push rod chamber, the push rod moves longitudinally within the guide sleeve under action of an external force, each of two opposing sides of the push rod is provided with a rack, respectively meshing with a push rod upper gear and a push rod lower gear, the translational movement of the push rod and the rotation of the push rod upper gear and the push rod lower gear interact and drive with each other, a controllable blocking mechanism is arranged in the push rod chamber and is used for blocking or releasing the translational movement of the push rod toward a side of tension spring, the first chain wheel and the second chain wheel are on a same side and respectively fixed on an outer end of the compression spring and an outer end of the tension spring, the chain is the one with a fixed length, and two ends of the chain penetrate respectively through inner-hollow spaces of the cylindrical spiral compression spring and the cylindrical spiral tension spring, and the two ends of the chain are connected with both ends of the push rod, wherein a main part of the chain is positioned outside the push rod chamber and meshed with the first chain wheel and the second chain wheel, the spring tightening mechanism is a polygonal bolt-type protruding object in transmission connection with the first chain wheel via the clutch transmission device, wherein the spring tightening mechanism is configured to be directionally screwed by a torque wrench and to drive the first chain wheel via the clutch transmission device to rotate and then to pull the push rod moving translationally toward a side of the compression spring, so that the compression spring is compressed, the tension spring is elongated, and elastic potential energy produced by elastic deformation is stored therein, when the controllable blocking mechanism releases the translational movement of the push rod, the translational movement of the push rod is reset toward the side of the tensile spring under elastic action, the rotation of the push rod lower gear drives the push rod to move translationally toward the side of the compression spring to compress the compression spring and stretch the tensile spring to produce elastic deformation and store spring elastic potential energy, while the push rod lower gear is in transmission connection with the braking energy storage transmission mechanism via the clutch transmission device, used to participate in the braking energy storage transmission, and the push rod, when moving translationally toward the side of the tensile spring to release the stored spring elastic potential energy, drives the push rod upper gear, which is in transmission connection with the first accelerating gear via the clutch transmission device, to rotate, and then the push rod outputs torque toward the flywheel via the inner gear ring assembly to start the energy release drive transmission mechanism.

5. The system according to claim 1, wherein the compressed air reserving-releasing device comprises a spring cylinder, a pneumatic piston and a pneumatic push rod, wherein:

the spring cylinder includes a spring cylinder cavity, an inflation valve and a helical spring, wherein:
a gas medium within the spring cylinder cavity has a set initial air pressure;
the inflation valve is arranged at the end of the spring cylinder cavity, used for pre-inflating the spring cylinder cavity with air to the set initial air pressure; and
the helical spring is arranged between the end of the spring cylinder cavity and an inner side of the pneumatic piston in the spring cylinder cavity;

the pneumatic piston is in a sliding fit with an inner wall of the spring cylinder cavity, an outer side of the pneumatic piston is connected to the pneumatic push rod; and the pneumatic push rod is accommodated into a long tube-type motion chamber and translates longitudinally in the motion chamber under an action of an external force, wherein:
a guide bracket arranged inside the motion chamber guides the translational movement of the pneumatic push rod within the motion chamber;
controllable blocking mechanisms are arranged segmentally on an inner wall of the motion chamber, used to block or release an end of the pneumatic push rod to move translationally toward outside a spring cylinder,
each of two opposing sides of the pneumatic push rod is provided with a rack, respectively meshing with a pneumatic push rod upper gear and a pneumatic push rod lower gear,
the translational movement of the pneumatic push rod and the rotation of the pneumatic push rod upper gear and the pneumatic push rod lower gear interact with and drive each other,
the rotation of the pneumatic push rod lower gear drives the pneumatic push rod to move translationally toward inside the spring cylinder, compressing an air medium therein, and the helical spring to store potential energies of air pressure and spring elasticity, while the pneumatic push rod lower gear is in transmission connection with the braking energy storage transmission mechanism via the clutch transmission device to participate in the braking energy storage transmission, and
the pneumatic push rod, when moving translationally toward outside spring cylinder to release the stored potential energies of air pressure and spring elasticity, drives the pneumatic push rod upper gear, which is in transmission connection with the second accelerating gear via the clutch transmission device, to rotate, and then the pneumatic push rod outputs torque toward the flywheel via the inner gear ring assembly, starting the energy release drive transmission mechanism.

6. The system according to claim 1 wherein:
the boiler-type HCAPS device, the air storage tubes and the cylinder-combined engine form a pneumatic transmission system,
the boiler-type HCAPS device and/or the air storage tubes are used as an air source device of the pneumatic transmission system, the cylinder-combined engine is used as a pneumatic actuator to convert air energy into mechanical energy, and the boiler-type HCAPS device, as an air source, provides compressed air for a pneumatic torque wrench as power to twist a spring tightening mechanism, so that an automobile-mounted spring reserving-releasing device stores elastic potential energy for later use, and/or a spring cylinder of an automobile-mounted compressed air reserving-releasing device is supplemented with the compressed air to maintain an initial air pressure therein and a reserving-releasing function thereof.

7. The system according to claim 4, wherein the braking energy storage transmission mechanism is a brake shaft being provided beside a transmission shaft, including an overrunning clutch with a function of torque one-way transmission and a torque limiter with a function of overload protection added onto the transmission shaft, a tooth chain joining a formation of the clutch transmission device between the transmission shaft and the brake shaft, a tooth chain wheel, a brake gearbox and a brake driving wheel arranged on the brake shaft, wherein:

the brake driving wheel is respectively in transmission connection with the push rod lower gear and/or the pneumatic push rod lower gear via the clutch transmission device, when the automobile starts, accelerates and runs, a power transmission process of an energy release drive transmission mechanism includes that the torque transmitted from the flywheel, a clutch and a gearbox in the conventional automobile power transmission process is continuously forward transmitted through the overrunning clutch and the torque limiter to the transmission shaft, a differential mechanism, a half axle and a driving wheels to drive an automobile, and when the automobile decelerates and brakes, the power transmission process of the braking energy storage transmission mechanism includes that the torque of the driving wheels is completely transmitted to the brake shaft through the half axle, the differential mechanism, the transmission shaft, the torque limiter, the tooth chain and the tooth chain wheel, wherein the torque is not reversely transmitted through the overrunning clutch backward to the gearbox, wherein the torque limiter plays a role in overload protection for torque transmission to the brake shaft, the torque transmitted to the brake shaft is further transmitted through the brake gearbox and the brake driving wheel respectively to the push rod lower gear and/or the pneumatic push rod lower gear via the clutch transmission device, and the push rod moves in translational towards the side of the compression spring and/or the pneumatic push rod moves in translational towards inside spring cylinder, to perform the braking energy storage.

8. The system according to claim 4, wherein:
the compressed air power device comprises two sets of the cylinder-combined engines, and
the plurality of acting gears include a first acting gear, a second acting gear, a third acting gear, and a fourth acting gear, wherein:

the first acting gear and the second acting gear are respectively in transmission connection via the clutch transmission device with the first cylinder piston rod upper gear and the second cylinder piston rod upper gear in one set of cylinder-combined engine, the third acting gear and the fourth acting gear are respectively in transmission connection via the clutch transmission device with the first cylinder piston rod upper gear and the second cylinder piston rod upper gear in another set of cylinder-combined engine, and the first acting gear, the second acting gear, the third acting gear, the fourth acting gear, the first accelerating gear and the second accelerating gear are in symmetrical arrangement within the inner gear ring, and transmit respective rotating torques to the inner gear ring, which collaboratively gathers the torques and mixes the power, to output the torque to the flywheel via the flywheel front inner meshing gear, the plurality of reset gears include a first reset gear, a second reset gear, a third reset gear and a fourth reset gear, wherein:

the first reset gear, the second reset gear, the third reset gear, and the fourth reset gear are arranged in symmetrical arrangement within the inner gear ring, the first reset gear, the second reset gear, the third reset gear, and the fourth reset gear rotate under drive of the rotation of the inner gear ring and reversely transmit the torque to the piston rod lower gear of each cylinder in time respectively via the clutch transmission device to promote a timely return stroke of each cylinder piston rod, the first reset gear and second reset gear are respectively in transmission connection with the first cylinder piston rod lower gear and the second cylinder piston rod lower gear in one set of cylinder-combined engine via the clutch transmission device to respectively promote the two respective cylinder piston rods for the return stroke in time, and the third reset gear and fourth reset gear are respectively in transmission connection with the first cylinder piston rod lower gear and the second cylinder piston rod lower gear in another set of cylinder-combined engine via the clutch transmission device to respectively promote the two respective cylinder piston rods for a return stroke in time, and the torque transmitted from the rotation of the acting gears to the inner gear ring made by each cylinder power stroke is significantly greater than that consumed from the rotation of the inner gear ring for the rotation of the reset gears to drive each cylinder return stroke, so that the inner gear ring can output sufficient surplus torque to the flywheel.

9. The system according to claim 8, wherein the mechanical transmission which can be connected or disconnected in the clutch transmission devices can be axis parallel gears combined transmission, bevel gear pair and/or chain transmission;

the clutch transmission devices comprise:
first clutch transmission device, divided into a first clutch transmission device A and a first clutch transmission device B, wherein:

the first clutch transmission device A is arranged between the first cylinder piston rod upper gear and the first acting gear to control the switch between the connected or disconnected states to transmit the torque from the first cylinder piston rod upper gear to the first acting gear; and the first clutch transmission device B is arranged between the second cylinder piston rod upper gear and the second acting gear to control the switch between the connected or disconnected states to transmit the torque from the second cylinder piston rod upper gear to the second acting gear;
second clutch transmission device, divided into a second clutch transmission device A and a second clutch transmission device B, wherein:
the second clutch transmission device A is arranged between the first cylinder piston rod lower gear and the first reset gear to control the switch between the connected or disconnected states to transmit the torque from the first reset gear to the first cylinder piston rod lower gear; and
the second clutch transmission device B is arranged between the second cylinder piston rod lower gear and the second reset gear to control the switch between the connected or disconnected states to transmit the torque from the second reset gear to the second cylinder piston rod upper gear;
third clutch transmission device arranged between the push rod upper gear and the first accelerating gear to control the switch between the connected or disconnected states to transmit the torque from the push rod upper gear to the first accelerating gear;
fourth clutch transmission device arranged between the pneumatic push rod upper gear and the second accelerating gear to control the switch between the connected or disconnected states to transmit the torque from the pneumatic push rod upper gear to the second accelerating gear;
fifth clutch transmission device arranged between the brake driving wheel and the push rod lower gear to control the switch between the connected or disconnected states to transmit the torque from the brake driving wheel to the push rod lower gear;
sixth clutch transmission device arranged between the brake driving wheel and the pneumatic push rod lower gear to control the switch between the connected or disconnected states to transmit the torque from the brake driving wheel to the pneumatic push rod lower gear;
seventh clutch transmission device arranged between the spring tightening mechanism and the first chain wheel to control the switch between the connected or disconnected states to transmit the torque from the spring tightening mechanism to the first chain wheel; and
eighth clutch transmission device arranged between the transmission shaft and the brake shaft to control the switch between the connected or disconnected states to transmit the torque from the transmission shaft to the brake shaft, wherein:
the connected or disconnected mechanical transmission mechanisms of the first clutch transmission device and the connected or disconnected mechanical transmission mechanisms of the second clutch transmission device are identical in structure, but opposite in torque transmission direction;
one end of the first clutch transmission device and one end of the second clutch transmission device are the inner gear ring assembly where each acting gears and each reset gears are identical in radius, tooth shape and tooth number, while another end is the cylinder-combined engine where each piston rod upper gears and each piston rod lower gears are identical in radius, tooth shape and tooth number;

the piston rods of the first cylinder and the second cylinder are identical in length;
the racks on the two opposite sides of the piston rods of the first cylinder and the second cylinder are identical in length, tooth shape and tooth number; and
the controller respectively controls the first clutch transmission devices and the second clutch transmission devices to be switched periodically and orderly between the connected and disconnected states, to make each of the first cylinder and the second cylinder repeat transformation between the power stroke and the return stroke, and in each cylinder-combined engine, the power stroke of the first cylinder is synchronous with the return stroke of the second cylinder, and then the return stroke of the first cylinder is synchronous with the power stroke of the second cylinder, alternatively.

10. A method of the system according to claim 9, the method comprising:
a) producing and supplying compressed air at the main-station, wherein the boiler-type HCAPS device is pressurized and inflated by the air compressor utilizing off-peak electricity during night or wind power and solar energy power which is not easy to store, and a control system regulates emission from the air compressor to the bent tube-type high-pressure compressed air storage adapted to a flow of cooling water entering the water tank, so that a large amount of air is compressed in the bent tube-type high-pressure compressed air storage, and pressurized to a predefined high pressure and stored for later use, meanwhile, the cooling water is heated to a predefined higher temperature and converged to the central heating system;
b) regulating a flow rate and velocity of high-pressure compressed air from the bent tube-type high-pressure compressed air storage in the boiler-type HCAPS device into the automobile-mounted air storage tubes so that the compressed air in the air storage tubes reaches the set pressure without a major change in temperature during an air inflation process;
c) starting, when the automobile starts or accelerates, the energy release drive transmission mechanism of the spring reserving-releasing device and/or compressed air reserving-releasing device, wherein the cylinder-combined engines powered by compressed air and their transmission mechanism work simultaneously to drive the automobile beginning to run;
d) performing the following steps in each cylinder-combined engine while the automobile is running:
d1) before starting the power stroke in the first cylinder, abutting the piston in the first cylinder beside the blocking member outside the first cylinder closed end space;
opening the air storage tube inlet/exhaust valve and the first cylinder inlet valve while the first cylinder exhaust valve is in the closed state; and
heating the high-pressure compressed air injected from the air storage tubes to the first cylinder closed end space by the electric heater around the exhaust duct of the air storage tube and the electric heater around the first cylinder closed end space to increase the air pressure greatly, while both of the second cylinder inlet valve and the second cylinder exhaust valve are in a closed state, and the stopping terminal of the piston rod in the second cylinder abuts against the buffering shock-absorbing device;

d2) immediately closing the air storage tube inlet/exhaust valve and the first cylinder inlet valve while the first cylinder exhaust valve remains closed;

pushing the piston and the piston rod of the first cylinder by the high-pressure compressed air that has been injected into the first cylinder closed end space to move towards the outside of the piston where a pressure is atmosphere pressure, wherein a pressure difference between inside and outside the piston is great, strongly promoting the power stroke in the first cylinder;

moving the piston rod of the first cylinder translationally outward to drive the first cylinder piston rod upper gear acting rotation and to transmit the torque via the first clutch transmission device A which is in the connected state to rotate the first acting gear and drive the rotation of the inner gear ring, while the second clutch transmission device A is in the disconnected state so that the first cylinder piston rod lower gear is in lower gear idling;

driving, by the second reset gear rotating along with the inner gear ring and through the second clutch transmission device B which is in the connected state at this time, the second cylinder piston rod lower gear to reset rotation to promote the return stroke of the piston rod in the second cylinder, since when the second cylinder inlet valve is closed while the second cylinder exhaust valve is opened and communicated directly with the atmosphere, the resistance to the return stroke in the second cylinder is very small, and the first clutch transmission device B is in the disconnected state, so that the second cylinder piston rod upper gear is in upper gear idling, wherein the torque produced by the rotation of the first acting gear and transmitted to the inner gear ring is significantly greater than that consumed from the rotation of the inner gear ring for driving the second reset gear to rotate, so that the torque obtained by the inner gear ring is output in a high ratio via the flywheel front inner meshing gear to the flywheel;

d3) before the power stroke ends and the return stroke is about to begin in the first cylinder, the stopping terminal of the piston rod abuts against the buffering shock-absorbing device;

at the same time, before the return stroke ends and the power stroke is about to begin in the second cylinder, the piston abuts beside the blocking member outside the second cylinder closed end space;

at this time, the first clutch transmission device A, the first clutch transmission device B, the second clutch transmission device A and the second clutch transmission device B are all in the disconnected states, the first cylinder inlet valve remains closed, the second cylinder exhaust valve is immediately closed, and the first cylinder exhaust valve and the second cylinder inlet valve are then opened and communicated with each other directly, so that the compressed air which retains a certain pressure in the first cylinder is quickly spread through the opened first cylinder exhaust valve and second cylinder inlet valve into the second cylinder closed end space;

d4) both the second clutch transmission device A and the first clutch transmission device B are in the connected states;

the first cylinder inlet valve remains closed;

the first cylinder exhaust valve and the second cylinder inlet valve remain opened and communicated with each other;

driving, by the first reset gear rotating along with the inner gear ring and through the second clutch transmission device A which is in connected state at this time, the first cylinder piston rod lower gear to reset rotation, promoting the return stroke of the piston rod in the first cylinder, while the first clutch transmission device A is in the disconnected state, so that the first cylinder piston rod upper gear is in upper gear idling;

at the same time, the second cylinder exhaust valve remains closed, while the second cylinder inlet valve and the first cylinder exhaust valve remain opened and communicated with each other, the pressure of the compressed air in the second cylinder closed end space being higher than that of atmosphere pressure outside the piston of the second cylinder to promote the piston and the piston rod in the second cylinder to translationally move outwards and to start the power stroke in the second cylinder;

moving the piston rod of the second cylinder translationally outward drives the second cylinder piston rod upper gear acting rotation transmitting the torque via the first clutch transmission device B which is in the connected state to the second acting gear to rotate and drive the rotation of the inner gear ring, while the second clutch transmission device B is in the disconnected state so that the second cylinder piston rod lower gear is in lower gear idling;

at this time the second cylinder closed end space is in communication with the cylinder cavity of the first cylinder;

while the radius r2 of the cylinder cavity of the second cylinder is greater than the radius r1 of the cylinder cavity of the first cylinder, r2>r1, and r2 is $\sqrt{((mn-1)/u)}$ times of r1, an area of the piston of the second cylinder is significantly greater than that of the first cylinder, a pushing force of the power stroke in the second cylinder is significantly greater than the resistance of the return stroke in the first cylinder;

in the process, the torque transmitted from the rotation of the second acting gear to the inner gear ring made by the power stroke in the second cylinder is significantly greater than that consumed from the rotation of the inner gear ring for the rotation of the first reset gear to drive the return stroke in the first cylinder, so that the inner gear ring can have a certain torque to output via the flywheel front inner meshing gear to the flywheel;

when the return stroke in the first cylinder and the power stroke in the second cylinder end simultaneously, the air pressure both in the first cylinder closed end space and in the cylinder cavity of the second cylinder drops to that close to the atmosphere pressure, then the piston of the first cylinder abuts beside the blocking member outside the first cylinder closed end space while the stopping terminal of the piston rod of the second cylinder abuts against the buffering shock-absorbing device;

d5) repeating step d1; and e) when the automobile decelerates and/or brakes, allowing the spring reserving-releasing device and/or compressed air reserving-releasing device and the braking energy storage transmission mechanism thereof to convert the kinetic energy reduced during the automobile decelerates and/or brakes into the potential energy for storage, and to convert the potential energy back into the automobile kinetic energy when the automobile starts and/or accelerates.

* * * * *